(12) United States Patent
Jones et al.

(10) Patent No.: US 12,320,040 B2
(45) Date of Patent: Jun. 3, 2025

(54) WOVEN STRUCTURE AND METHOD OF MANUFACTURE

(71) Applicant: ROLLS-ROYCE plc, London (GB)

(72) Inventors: Christopher D Jones, Bristol (GB); Adam J Bishop, Bristol (GB); Richard Hall, Bristol (GB); Ian Buck, Loughborough (GB); Sarvesh Dhiman, Loughborough (GB)

(73) Assignee: ROLLS-ROYCE plc, London (GB)

( * ) Notice: Subject to any disclaimer, the term of this patent is extended or adjusted under 35 U.S.C. 154(b) by 29 days.

(21) Appl. No.: 18/220,922

(22) Filed: Jul. 12, 2023

(65) Prior Publication Data

US 2024/0035210 A1    Feb. 1, 2024

(30) Foreign Application Priority Data

Jul. 25, 2022    (GB) ...................................... 2210823

(51) Int. Cl.
     *B29C 70/24*      (2006.01)
     *D03D 11/00*      (2006.01)
     *D03D 25/00*      (2006.01)

(52) U.S. Cl.
     CPC .............. *D03D 11/00* (2013.01); *B29C 70/24* (2013.01); *D10B 2505/02* (2013.01)

(58) Field of Classification Search
     CPC ..... B29C 70/228; B29C 70/222; B29C 70/25; D03D 25/005
     See application file for complete search history.

(56) References Cited

U.S. PATENT DOCUMENTS

| 4,379,798 A | * | 4/1983 | Palmer .................... B29C 70/24 |
| | | | 442/205 |
| 5,026,595 A | | 6/1991 | Crawford, Jr. et al. |

(Continued)

FOREIGN PATENT DOCUMENTS

| EP | 2 780 665 B1 | 2/2020 |
| JP | H09-157993 A | 6/1997 |

(Continued)

OTHER PUBLICATIONS

Dec. 7, 2023 Extended Search Report issued in European Patent Application No. 23183215.5.

(Continued)

*Primary Examiner* — Matthew J Daniels
(74) *Attorney, Agent, or Firm* — Oliff PLC

(57) ABSTRACT

A method for manufacturing a composite component, including: weaving a multi-layer woven preform from warp and weft tows of fibre-reinforcement material, the woven preform includes: multi-layer weave including: plurality of weft tow layers; plurality of laterally-adjacent stacks extending along the longitudinal direction, primary portion having longitudinal extent along woven preform, the primary portion having one or more edge regions each defining respective lateral side of primary portion; wherein for the or each edge region: the multi-layer weave defines at least the edge region; plurality of stacks in the edge region are binding stacks in which one or more warp tows are interlaced to bind a respective plurality of weft tow layers; weave property differs between binding stacks in the edge region to reduce a thickness of the edge region towards respective lateral side. Also disclosed herein is a woven structure, formed by warp and weft tows of fibre reinforcement material.

7 Claims, 15 Drawing Sheets

(56) References Cited

U.S. PATENT DOCUMENTS

| | | | |
|---|---|---|---|
| 11,346,228 | B1 | 5/2022 | Burdette et al. |
| 2006/0121809 | A1 | 6/2006 | Goering |
| 2006/0130957 | A1* | 6/2006 | Kostar .................... B29B 11/16 |
| | | | 442/205 |
| 2011/0182743 | A1 | 7/2011 | Naik |
| 2011/0318513 | A1 | 12/2011 | Marsal et al. |
| 2013/0094898 | A1 | 4/2013 | Seack et al. |
| 2014/0265020 | A1 | 9/2014 | Hollander |
| 2014/0334935 | A1 | 11/2014 | Dambrine et al. |
| 2015/0226071 | A1 | 8/2015 | Marshall et al. |

FOREIGN PATENT DOCUMENTS

| | | | |
|---|---|---|---|
| WO | 2010/053754 | A1 | 5/2010 |
| WO | 2021/034327 | A1 | 2/2021 |

OTHER PUBLICATIONS

Dec. 7, 2023 Extended Search Report issued in European Patent Application No. 23183216.3.
Jan. 20, 2023 Search Report issued in British Patent Application No. 2210823.7.
Jan. 20, 2023 Search Report issued in British Patent Application No. 2210820.3.
U.S. Appl. No. 18/220,932, filed Jul. 12, 2023 in the name of Christopher D Jones et al.

* cited by examiner

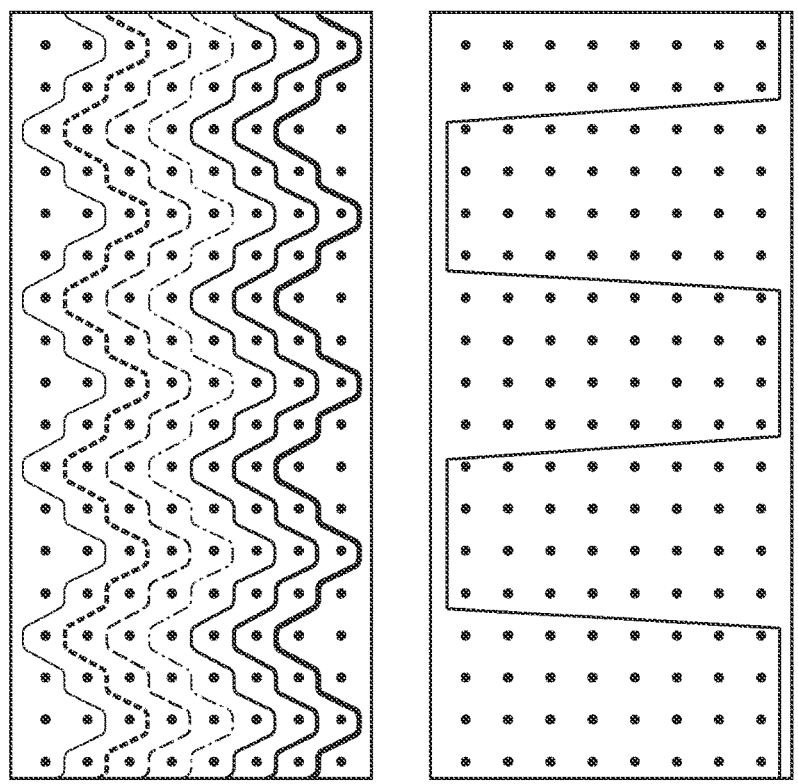
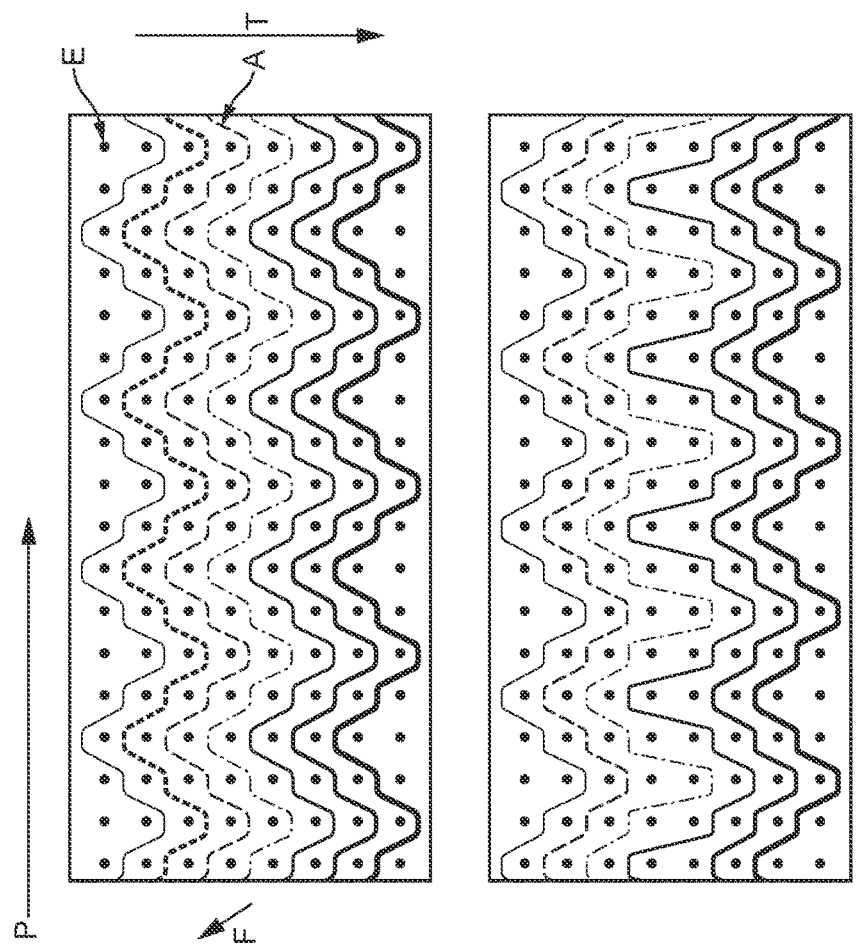
FIG. 10a
FIG. 10b

WOVEN STRUCTURE AND METHOD OF MANUFACTURE

CROSS-REFERENCE TO RELATED APPLICATIONS

This specification is based upon and claims the benefit of priority from United Kingdom patent application number GB 2210823.7 filed on 25 Jul. 2022, the entire contents of which is incorporated herein by reference.

BACKGROUND

Field of the Disclosure

The disclosure concerns woven structures and associated methods of manufacture, in particular woven structures comprising a multi-layer weave.

Description of the Related Art

It is known to use composite materials comprising a matrix reinforced with fibre reinforcement material such as carbon fibre for components to provide a desirable combination of properties, such as strength and low weight.

Woven structures of fibre reinforcement material have been proposed for use in the manufacture of composite components, owing to improved properties relating to structural integrity. It is known to use multi-layer (or 3D) weaves, formed by weaving with multiple layers of warp yarn, for providing through-thickness structural integrity to a woven structure.

Looms can be used to make woven structures and can be controlled to separate respective sets of warp tows to define an opening for insertion of a weft tow between them. For example, a set of warp tows may be lifted to an upper side of the opening so as to pass over the weft tow, whereas another set may extend below the opening so as to pass under the weft tow. Automatic looms, which may be computer controlled, are known for creating diverse multi-weave structures.

SUMMARY OF THE DISCLOSURE

Aspect 1. A method for manufacturing a composite component, comprising:
  weaving a multi-layer woven preform for the component from warp and weft tows of fibre-reinforcement material, so that the woven preform comprises:
    a longitudinal direction corresponding to an elongate extent of warp tows of the woven preform;
    a lateral direction transverse to the longitudinal direction;
    a shell portion having a longitudinal extent along the woven preform;
    wherein the shell portion comprises two leaves in superposition, each having a multi-layer weave, the leaves being joined along bound edges of the shell portion by binding tows extending between the leaves to form an inter-leaf channel therebetween;
  inserting a forming element into the inter-leaf channel to cause the shell portion to adopt a near net shape for the component.

Aspect 2. A method according to Aspect 1, wherein the bound edges of the shell portion are at lateral sides of the shell portion.

The bound edges may generally extend along the longitudinal direction. The bound edges may primarily extend along longitudinal direction, such that they have a component in the longitudinal direction which is substantially greater (e.g. greater) than a component in the lateral direction).

Aspect 3. A method according to Aspect 1 or 2, wherein the forming element has a tapered end for insertion into the inter-leaf channel, and a forming portion for locating in the inter-leaf channel to cause the shell portion to adopt a near net shape for the component.

Aspect 4. A method according to any preceding Aspect, wherein the step of weaving the woven preform is conducted so that the woven preform comprises:
  a free portion longitudinally adjacent to the shell portion at an unbound boundary of the shell portion, the free portion having two opposing leaves in superposition, each leaf having a multi-layer weave, each leaf corresponding to and contiguous with a respective leaf of the shell portion;
  wherein the leaves of the free portion are free to separate from one another throughout their longitudinal and lateral extents, while remaining attached to the shell portion;
  and wherein the method further comprises separating the leaves of the free portion to adopt a near net shape for the component.

It may be that lateral sides of the free portion corresponds to lateral side of the respective portion of the composite component. The above definitions of the shell and free portions may apply to the woven preform after any trimming operation to prepare the woven preform for forming the composite component, for example, such that the shell portion retains the bound edges and the free portion comprises opposing leaves which are free to separate from one another throughout their longitudinal and lateral extents.

The leaves of the free portion may be free to separate from one another throughout the longitudinal extent of the free portion, and throughout the lateral extent of the woven preform.

Aspect 5. A method according to Aspect 4, wherein the step of weaving the woven preform is conducted so that:
  one or both of the bound edges of the shell portion is offset from a respective lateral side of the woven preform;
  the free portion has a greater lateral extent than the unbound boundary of the shell portion;
  the woven preform comprises one or more tab portions, each tab portion having a multi-layer weave continuous with, and extending longitudinally from, a respective leaf of the free portion beyond the unbound boundary of the shell portion, to be laterally adjacent the shell portion;
  wherein the or each tab portion is for forming a join with the opposing leaf or a tab portion associated with the respective leaf.

Aspect 6. A method according to Aspect 5, wherein the step of weaving the woven preform is conducted so that:
  a multi-layer bound thickness tapers along the longitudinal extent of one or more of the tab portions, for forming a tapered join with the opposing leaf or a tab portion associated with the respective leaf.

The multi-layer bound thickness may be defined by the number of weft tows bound by binding warp tows.

A tapered join may be a join between overlapping portions, one or both of which tapers in thickness along a direction corresponding to an overlapping extent of the join.

Aspect 7. A method according to any of Aspects 5-6, comprising:
trimming the woven preform to define a longitudinal end of the tab portion opposing the free portion; and/or
trimming the woven preform to define a lateral side of the tab portion to permit deflection of the tab portion relative to the laterally-adjacent shell portion.

Aspect 8. A method according to any of Aspects 5-7 comprising forming a join between the opposing leaves of the free portion by:
separating the leaves of the free portion;
configuring one or more of the tab portions to be in superposition with the respective opposing free portion or an associated tab.

Aspect 9. A method according to any of Aspects 4-8, comprising applying the woven preform to a forming structure so that the leaves of the free portion are received on respective portions of the forming structure to adopt the near net shape for the component.

Aspect 10. A method according to any of Aspects 4-8, wherein the step of weaving the woven preform is conducted so that there is a plurality of free portions, each longitudinally adjacent to a respective shell portion at an unbound boundary of the shell portion.

Each of the free portions may have any of the features described above.

Aspect 11. A method according to any preceding Aspects, wherein the step of weaving the woven preform is conducted so that there is a plurality of shell portions, optionally wherein the shell portions are longitudinally spaced apart by respective free portions in accordance with any of Aspects 4-10.

Each of the shell portions may have any of the features described above.

Aspect 12. A method according to any preceding Aspect, wherein the woven preform is for forming a component comprising one or more aerofoils each defined by a respective shell portion.

Aspect 13. A method according to any of Aspects 4-11, wherein the woven preform is for forming a component comprising one or more aerofoils each defined by a respective shell portion; and one or more platforms each defined at a respective spanwise end of the aerofoil by leaves of a respective free portion.

Aspect 14. A method according to any preceding Aspect, further comprising:
conducting a resin infusion operation on the woven preform; and/or
conducting a forming operation to cure the woven preform.

Aspect 15. A woven structure formed by warp and weft tows of fibre reinforcement material, comprising:
a shell portion comprising two leaves, each comprising a multi-layer weave;
wherein the leaves are joined at two bound edges of the shell portion by binding tows extending between the leaves, thereby forming an inter-leaf channel therebetween;
wherein the leaves separate between the two edges so that the inter-leaf channel is open.

Aspect 16. A woven structure according to Aspect 15, wherein the shell portion defines two closed loop boundaries at respective opposing ends of the shell portion, each boundary having two loop segments corresponding to the two leaves of the shell portion;
wherein the woven structure comprises one or more support members, each extending from a respective loop segment;
wherein the or each support member comprises a multi-layer weave and is contiguous with the respective leaf of the shell portion.

Aspect 17. A woven structure according to Aspect 15 or 16, wherein the woven structure is a preform for a composite component.

Aspect 18. A woven structure according to Aspect 15 or 16, wherein the woven structure is a composite component.

Aspect 19. A woven structure according to Aspect 16 and according to Aspect 18, wherein the bound edges are spaced apart with respect to a lateral direction of the component;
wherein for one or both of the closed loop boundaries, there are two opposing support members extending from the two leaves of the shell portion respectively;
wherein the two support members are joined at a join to form a support structure which extends around the respective closed loop boundary.

Aspect 20. A woven structure according to Aspect 19, wherein one or both of the joined support members comprises a tab portion which:
has no tows in common with the shell portion; and
is in superposition with the opposing support member or an associated tab portion of the opposing support member to form the join.

Aspect 21. A woven structure according to Aspect 20, wherein a multi-layer bound thickness tapers along a tab portion or one or more opposing tab portions forming the join, so that the join comprises a tapered join.

A tapered join may be a join between overlapping portions, one or both of which tapers in thickness along a direction corresponding to an overlapping extent of the join.

Aspect 22. A woven structure according to any of Aspects 18-21, comprising one or more aerofoils each defined by a respective shell portion.

Aspect 23. A woven structure according to any of Aspects 18-21, comprising:
one or more aerofoils each defined by a respective shell portion; and
one or more platforms each defined at a respective spanwise end of the aerofoil by one or more support members extending from the shell portion.

With reference to aspects relating to the method and/or the composite component, the composite component may be a stator vane, optionally comprising a vane portion and one or more platform portions. The composite component may be a stator vane segment comprising a plurality of vane portions extending between.

The composite component may be a rotor blade, optionally comprising a rotor blade portion and one or more platform portions (e.g. corresponding to a radially inner root and/or a radially outer enclosure or shroud tip for the rotor portion). The composite component may be a rotor segment comprising a plurality of rotor blade portions extending from a radially inner platform portion (e.g. a root platform). There may be a radially outer enclosure platform extending around the plurality of rotor blade portions, or each rotor blade portion may be provided with a discrete platform forming a should tip for the respective rotor portion.

Aspect 24. A non-transitory computer-readable medium comprising instructions which, when executed by a processor, are configured to cause a performance of a method in accordance with any of Aspects 1-2, 5-7 and 10-13.

Aspect 25. A non-transitory computer-readable medium comprising model data for a woven preform as defined in any of Aspects 1-2, 5-7, 10-13, 15 or a woven structure as defined in any of Aspects 15-23.

Aspect 26. A method for manufacturing a composite component, comprising:
weaving a multi-layer woven preform for the component from warp and weft tows of fibre-reinforcement material, so that the woven preform comprises:
a longitudinal direction corresponding to an elongate extent of warp tows of the woven preform;
a lateral direction transverse to the longitudinal direction;
a plurality of longitudinally adjacent portions, including a primary portion having a first longitudinal extent along the woven preform and a secondary portion having a second longitudinal extent along the woven preform, a set of common warp tows extending though the plurality of portions;
wherein each portion has (i) a single free leaf, or (ii) two or more free leaves in superposition; each free leaf comprising a multi-layer weave, each free leaf being configured to freely separate from another free leaf of the same portion throughout the longitudinal extent and lateral extent of the portion;
wherein a number of free leaves defined by the primary portion and the secondary portion differ for forming respective portions of the composite component.

Aspect 27. A method according to Aspect 26, wherein the primary portion comprises a single free leaf and the secondary portion comprises two free leaves, the method comprising separating the leaves of the secondary portion to adopt a near net shape for the component.

Aspect 28. A method according to Aspect 27, comprising applying the woven preform to a forming structure so that the free leaves of the free portion are received on respective portions of the forming structure to adopt the near net shape for the component.

Aspect 29. A method according to any of Aspects 27-28, wherein the step of weaving the woven preform is conducted so that there is a plurality of secondary portions, each longitudinally adjacent to a respective primary portion at a boundary of the primary portion.

Aspect 30. A method according to any of Aspects 26-29, wherein the step of weaving the woven preform is conducted so that there is a plurality of primary portions, wherein the primary portions are longitudinally spaced apart by respective secondary portions.

Aspect 31. A method according to any of Aspects 26-30, wherein the step of weaving the woven preform is conducted so that the primary portion is a shell portion comprising two leaves in superposition, each having a multi-layer weave, the leaves being joined along bound edges of the shell portion by binding tows extending between the leaves to form an inter-leaf channel therebetween and such that the shell portion defines a single free leaf;
wherein the method further comprises inserting a forming element into the inter-leaf channel to cause the shell portion to adopt a near net shape for the component.

Aspect 32. A method according to any of Aspects 26-31, comprising, conducting a resin infusion operation on the woven preform; and/or conducting a forming operation to cure the woven preform;
so that the unbound portions of the weft tows are embedded in a composite matrix.

Aspect 33. A method according to any of Aspects 26-32, wherein the woven preform is for forming an aerospace product, optionally wherein the primary portion corresponds to an aerofoil; optionally wherein the or each secondary portion corresponds to a platform for the aerofoil.

Aspect 34. A woven preform for manufacturing a composite component, formed by warp and weft tows of fibre reinforcement material, comprising:
a longitudinal direction corresponding to an elongate extent of warp tows of the woven preform; a lateral direction transverse to the longitudinal direction;
a plurality of longitudinally adjacent portions, including a primary portion having a first longitudinal extent along the woven preform and a secondary portion having a second longitudinal extent along the woven preform, a set of common warp tows extending though the plurality of portions;
wherein each portion has (i) a single free leaf, or (ii) two or more free leaves in superposition; each free leaf comprising a multi-layer weave, each free leaf being configured to freely separate from another free leaf of the same portion throughout the longitudinal extent and lateral extent of the portion;
wherein a number of free leaves defined by the primary portion and the secondary portion differ for forming respective portions of the composite component.

Aspect 35. A woven preform according to Aspect 34, wherein the primary portion comprises a single free leaf and the secondary portion comprises two free leaves.

Aspect 36. A woven preform according to Aspect 34 or 35, wherein there is a plurality of secondary portions, each longitudinally adjacent to a respective primary portion at a boundary of the primary portion; and/or wherein there is a plurality of primary portions, wherein the primary portions are longitudinally spaced apart by respective secondary portions.

Aspect 37. A woven preform according to any of Aspects 34-36, wherein the primary portion is a shell portion comprising two leaves in superposition, each having a multi-layer weave, the leaves being joined along bound edges of the shell portion by binding tows extending between the leaves to form an inter-leaf channel therebetween and such that the shell portion defines a single free leaf; wherein the shell portion is configured to receive a forming element in the inter-leaf channel to adopt a near net shape for the component.

Aspect 38. A woven structure comprising:
a primary portion having a longitudinal extent between two longitudinal ends, the primary portion having a multi-layer weave;
at least two secondary members extending from the same longitudinal end of the primary portion, each having a multi-layer weave including warp tows which extend continuously from the primary portion into the respective secondary member such that the primary portion is integrally woven with the secondary members.

Aspect 39. A woven structure according to Aspect 38, wherein the primary portion is a shell portion comprising two leaves, each comprising a multi-layer weave;
wherein the leaves of the shell portion are joined at two bound edges by binding tows extending between the leaves, with an inter-leaf channel therebetween such that the shell portion defines a hollow cavity;
and wherein the secondary members extend continuously from each respective leaf.

Aspect 40. A woven structure according to Aspect 38 or Aspect 39, wherein the woven structure is a composite component for an aerospace application comprising one or more vanes defined by respective primary portions, and one or more platforms defined by be respective secondary members.

Aspect 41. A woven structure according to Aspect 40, wherein the woven structure is a vane segment comprising a plurality of vanes defined by respective primary portions, root and time platforms each defined by respective secondary members extending from respective longitudinal ends of the primary portions;
   optionally wherein at least two secondary members associated with the same platform are integrally formed with warp tows extending continuously between them; and/or
   optionally wherein at least two secondary members associated with the same platform are joined, without warp tows extending between them.

Aspect 42. A non-transitory computer-readable medium comprising instructions which, when executed by a processor, are configured to cause a performance of a method in accordance with any of Aspects 26-33.

Aspect 43. A non-transitory computer-readable medium comprising model data for a woven preform as defined in any of Aspects 26-33 or 34-37.

Aspect 44. A method for manufacturing a composite component, comprising:
   weaving a multi-layer woven preform for the component from warp and weft tows of fibre-reinforcement material, so that the woven preform comprises:
   a longitudinal direction corresponding to an elongate extent of warp tows of the woven preform; a lateral direction transverse to the longitudinal direction;
   a multi-layer weave comprising:
      a plurality of weft tow layers, each layer comprising an array of weft tows distributed along the longitudinal direction, arranged so that weft tows from each weft tow layer are superposed at longitudinally-distributed positions in the multi-layer weave;
      a plurality of laterally-adjacent stacks extending along the longitudinal direction, wherein each stack corresponds to a warp tow position along the lateral direction and comprises one or more warp tows in superposition within the stack;
   a primary portion having a longitudinal extent along the woven preform, the primary portion having one or more edge regions each defining a respective lateral side of the primary portion; wherein for the or each edge region:
   the multi-layer weave defines at least the edge region;
   a plurality of stacks in the edge region are binding stacks in which one or more warp tows are interlaced to bind a respective plurality of weft tow layers, wherein a number of weft tow layers bound in the respective stack is defined as a weft binding number; and
   along the lateral direction through the edge region towards the respective lateral side, the weft binding number reduces so that a plurality of partially bound weft tows have an unbound portion extending beyond a bound region of the multi-layer weave.

Aspect 45. A method according to Aspect 44, wherein for each partially bound weft tow, the respective unbound portion extends towards the respective lateral side of the primary portion beyond a last binding stack where it is bound, by a lateral extent corresponding to at least one stack of the multi-layer weave.

Aspect 46. A method according to Aspect 45 or 46, comprising trimming the plurality of weft tow layers so that the plurality of partially bound weft tows retain respective unbound portions.

Aspect 47. A method according to any of Aspects 44-46, comprising, for the or each edge region:
   trimming the plurality of weft tow layers along a common trimming line corresponding to the respective lateral side, throughout the longitudinal extent of the primary portion.

Aspect 48. A method according to Aspect 47, wherein the step of trimming the plurality of weft tow layers along a common trimming line is conducted using a trimming device that trims the plurality of weft tow layers at the respective lateral side in a single action.

Aspect 49. A method according to any of Aspects 44-48, comprising,
   conducting a resin infusion operation on the woven preform; and/or
   conducting a forming operation to cure the woven preform;
   so that the unbound portions of the weft tows are embedded in a composite matrix.

Aspect 50. A method according to any of Aspects 44-49, wherein weaving the multi-layer preform for the component is conducted so that, for one or more of the edge regions:
   binding stacks in the edge region have a layer-to-layer angle interlock multi-layer weave type, a number of binding warp tows in the respective stack being defined as a binding warp number, and wherein along the lateral direction through the edge region towards the respective lateral side, the binding warp number reduces.

Aspect 51. A method according to any of Aspects 44-50, wherein the step of weaving the woven preform is conducted so that the primary portion is a shell portion comprising two leaves in superposition, each having a multi-layer weave, the leaves being joined at the one or more edge regions by binding tows extending between the leaves, wherein adjacent to the edge region the leaves are separable from one another.

Aspect 52. A method according to Aspect 51, wherein the shell portion comprises two edge regions at respective lateral sides and is configured to form an inter-leaf channel therebetween;
   wherein the method further comprises inserting a forming element into the inter-leaf channel to cause the shell portion to adopt a near net shape for the component.

Aspect 53. A woven structure formed by warp and weft tows of fibre reinforcement material, comprising:
   a primary portion having a longitudinal extent, the primary portion having one or more edge regions each defining a respective lateral side of the primary portion;
   wherein the or each region is defined by a multi-layer weave comprising:
      a plurality of weft tow layers, each layer comprising an array of weft tows distributed along the longitudinal direction, arranged so that weft tows from each weft tow layer are superposed at longitudinally-distributed positions in the multi-layer weave a plurality of laterally-adjacent stacks extending along the longitudinal direction, wherein each stack corresponds to a warp tow position along the lateral direction and comprises one or more warp tows in superposition within the stack;
   wherein for the or each edge region:
      a plurality of stacks in the edge region are binding stacks in which one or more warp tows are interlaced to bind a respective plurality of weft tow layers, wherein a number of weft tow layers bound in the respective stack is defined as a weft binding number; and
      along the lateral direction through the edge region towards the respective lateral side, the weft binding number reduces so that a plurality of partially bound weft tows have an unbound portion extending beyond a bound region of the multi-layer weave.

Aspect 54. A woven structure according to Aspect 53, wherein for each partially bound weft tow, the respective unbound portion extends towards the respective lateral side of the primary portion beyond a last binding stack where it is bound, by a lateral extent corresponding to at least one stack of the multi-layer weave.

Aspect 55. A woven structure according to Aspect 53 or 54, wherein for one or more of the edge regions:
binding stacks in the edge region have a layer-to-layer angle interlock multi-layer weave type, a number of binding warp tows in the respective stack being defined as a binding warp number; and
wherein along the lateral direction through the edge region towards the respective lateral side, the binding warp number reduces.

Aspect 56. A woven structure according to Aspect 55, wherein the primary portion is a shell portion comprising two leaves in superposition, each having a multi-layer weave, the leaves being joined at the one or more edge regions by binding tows extending between the leaves, wherein adjacent to the edge region the leaves are separable or separated from one another.

Aspect 57. A woven structure according to any of Aspects 53-56, wherein the wherein the woven structure is a preform for a composite component, or a composite component.

Aspect 58. A woven structure according to any of Aspects 53-57, comprising an aerofoil defined by the primary portion.

Aspect 59. A non-transitory computer-readable medium comprising instructions which, when executed by a processor, are configured to cause a performance of a method in accordance with any of Aspects 44-52.

Aspect 60. A non-transitory computer-readable medium comprising model data for a woven preform as defined in any of Aspects 44-52 or a woven structure as defined in any of Aspects 53-57.

Aspect 61. A method for manufacturing a composite component, comprising:
weaving a multi-layer woven preform for the component from warp and weft tows of fibre-reinforcement material, so that the woven preform comprises:
a longitudinal direction corresponding to an elongate extent of warp tows of the woven preform;
a lateral direction transverse to the longitudinal direction;
a multi-layer weave comprising:
a plurality of weft tow layers, each layer comprising an array of weft tows distributed along the longitudinal direction, arranged so that weft tows from each weft tow layer are superposed at longitudinally-distributed positions in the multi-layer weave;
a plurality of laterally-adjacent stacks extending along the longitudinal direction, wherein each stack corresponds to a warp tow position along the lateral direction and comprises one or more warp tows in superposition within the stack;
a primary portion having a longitudinal extent along the woven preform, the primary portion having one or more edge regions each defining a respective lateral side of the primary portion;
wherein for the or each edge region:
the multi-layer weave defines at least the edge region;
a plurality of stacks in the edge region are binding stacks in which one or more warp tows are interlaced to bind a respective plurality of weft tow layers;

a weave property differs between binding stacks in the edge region to reduce a thickness of the edge region towards the respective lateral side.

Aspect 62. A method according to Aspect 61, wherein the weave property is one or more selected from the group consisting of:
a number of warp tows in a respective binding stack, defined as a binding warp number;
a type of multi-layer weave, selected from the group consisting of a layer-to-layer angle interlock; through-thickness angle interlock; through-thickness orthogonal interlock;
a number of weft tows bound in the respective stack, defined as a weft binding number;
for binding stacks having a layer-to-layer angle interlock multi-layer weave type, a number of binding warp tows having a multi-layer step in a respective repeating pattern, wherein a multi-layer step comprises a binding warp tow extending through two or more weft tow layers at the same longitudinal position.

Aspect 63. A method according to Aspect 61 or 62, wherein the step of weaving the woven preform is conducted so that, in the or each edge region:
the multi-layer weave has an alternating pattern of binding stacks and one or more non-binding stacks, wherein in each non-binding stack a majority of the warp tows remain at a single depth-wise position between weft tow layers without interlacing.

Aspect 64. A method according to Aspect 61 or 62, wherein the step of weaving the woven preform is conducted so that, in the or each edge region:
the binding stacks each have a plurality of warp tows which are interlaced to bind a respective plurality of weft tow layers;
the multi-layer weave has an alternating pattern of binding stacks and one or more intermediate stacks, each intermediate stack comprising a through-thickness angle interlock or through-thickness orthogonal interlock type of multi-layer weave.

Aspect 65. A method according to any of Aspects 61-64, wherein for the or each edge region, a number of weft tow layers bound in the respective stack is defined as a weft binding number; and
along the lateral direction through the edge region towards the respective lateral side, the weft binding number reduces so that a plurality of partially bound weft tows have an unbound portion extending beyond a bound region of the multi-layer weave.

Aspect 66. A method according to any of Aspects 61-65, comprising, conducting a resin infusion operation on the woven preform; and/or conducting a forming operation to cure the woven preform;
so that the unbound portions of the weft tows are embedded in a composite matrix.

Aspect 67. A method according to any of Aspects 61-66, wherein weaving the multi-layer preform for the component is conducted so that, for one or more of the edge regions:
binding stacks in the edge region have a layer-to-layer angle interlock multi-layer weave type, a number of binding warp tows in the respective stack being defined as a binding warp number; and
wherein along the lateral direction through the edge region towards the respective lateral side, the binding warp number reduces.

Aspect 68. A method according to any of Aspects 61-67, wherein the step of weaving the woven preform is conducted so that the primary portion is a shell portion comprising two leaves in superposition, each having a multi-layer weave, the leaves being joined at the one or more edge regions by binding tows extending between the leaves, wherein adjacent to the edge region the leaves are separable from one another.

Aspect 69. A method according to Aspect 68, wherein the shell portion comprises two edge regions at respective lateral sides and is configured to form an inter-leaf channel therebetween;
  wherein the method further comprises inserting a forming element into the inter-leaf channel to cause the shell portion to adopt a near net shape for the component.

Aspect 70. A woven structure formed by warp and weft tows of fibre reinforcement material, comprising:
  a primary portion having a longitudinal extent, the primary portion having one or more edge regions each defining a respective lateral side of the primary portion;
  wherein the or each region is defined by a multi-layer weave comprising:
    a plurality of weft tow layers, each layer comprising an array of weft tows distributed along the longitudinal direction, arranged so that weft tows from each weft tow layer are superposed at longitudinally-distributed positions in the multi-layer weave
    a plurality of laterally-adjacent stacks extending along the longitudinal direction, wherein each stack corresponds to a warp tow position along the lateral direction and comprises one or more warp tows in superposition within the stack;
  wherein for the or each edge region:
    the multi-layer weave defines at least the edge region;
    a plurality of stacks in the edge region are binding stacks in which one or more warp tows are interlaced to bind a respective plurality of weft tow layers;
    a weave property differs between binding stacks in the edge region to reduce a thickness of the edge region towards the respective lateral side.

Aspect 71. A woven structure according to Aspect 70, wherein the weave property is one or more selected from the group consisting of
  a number of warp tows in a respective binding stack, defined as a binding warp number;
  a type of multi-layer weave, selected from the group consisting of a layer-to-layer angle interlock; through-thickness angle interlock; through-thickness orthogonal interlock;
  a number of weft tows bound in the respective stack, defined as a weft binding number;
  for binding stacks having a layer-to-layer angle interlock multi-layer weave type, a number of binding warp tows having a multi-layer step in a respective repeating pattern, wherein a multi-layer step comprises a binding warp tow extending through two or more weft tow layers at the same longitudinal position.

Aspect 72. A woven structure according to Aspect 70 or 71, wherein the multi-layer weave has an alternating pattern of binding stacks and one or more non-binding stacks, wherein in each non-binding stack a majority of the warp tows remain at a single depth-wise position between weft tow layers without interlacing.

Aspect 73. A woven structure according to Aspect 70 or 71, wherein in the or each edge region:
  the binding stacks each have a plurality of warp tows which are interlaced to bind a respective plurality of weft tow layers;
  the multi-layer weave has an alternating pattern of binding stacks and one or more intermediate stacks, each intermediate stack comprising a through-thickness angle interlock or through-thickness orthogonal interlock type of multi-layer weave.

Aspect 74. A woven structure according to Aspect 73, wherein the primary portion is a shell portion comprising two leaves in superposition, each having a multi-layer weave, the leaves being joined at the one or more edge regions by binding tows extending between the leaves, wherein adjacent to the edge region the leaves are separable or separated from one another.

Aspect 75. A woven structure according to any of Aspects 70-74, wherein the wherein the woven structure is a preform for a composite component, or a composite component.

Aspect 76. A woven structure according to any of Aspects 70-75, comprising an aerofoil defined by the primary portion.

Aspect 77. A non-transitory computer-readable medium comprising instructions which, when executed by a processor, are configured to cause a performance of a method in accordance with any of Aspects 61-69.

Aspect 78. A non-transitory computer-readable medium comprising model data for a woven preform as defined in any of Aspects 61-89 or a woven structure as defined in any of Aspects 70-76.

Aspect 101 A method in accordance with any of aspects 1-14 and in accordance with any of aspects 26-33, wherein the or each shell portion of aspects 1-14 corresponds to respective primary portion(s) of aspects 26-33, and wherein the or each free portion of aspects 1-14 corresponds to respective secondary portion(s) of aspects 26-33.

Aspect 102 A method in accordance with any of aspects 1-14 and optionally in accordance with aspect 101, wherein the method is in accordance with any of aspects 44-52 and/or any of aspects 61-69, wherein the shell portion of aspects 1-14 corresponds to the primary portion of aspects 44-52 and/or aspects 61-69 respectively.

Aspect 102 A method in accordance with any of aspects 1-14 and optionally in accordance with aspect 101, wherein the method is in accordance with any of aspects 44-52 and/or any of aspects 61-69, wherein the shell portion of aspects 1-14 corresponds to the primary portion of aspects 44-52 and/or aspects 61-69 respectively.

Aspect 103 A woven structure in accordance with any of aspects 15-23 and in accordance with any of aspects 34-41, wherein the or each shell portion of aspects 15-23 corresponds to respective primary portion(s) of aspects 34-41, and wherein the or each support member of aspects 15-23 corresponds to respective secondary portions or secondary members of aspects 34-41.

Aspect 104 A woven structure in accordance with any of aspects 15-23 and optionally in accordance with aspect 103, wherein the woven structure is in accordance with any of aspects 53-58 and/or aspects 70-76, wherein the or each shell portion of aspects 15-23 corresponds to respective primary portions(s) of aspects 53-58 and/or aspects 70-76 respectively.

Aspect 105 A non-transitory computer readable medium (NTCRM) according to aspect 24 and in accordance with aspect 42, wherein the or each shell portion of aspect 24 corresponds to respective primary portion(s) of aspect 42, and the or each free portion of aspect 24 corresponds to the or each secondary portion of aspect 17.

Aspect 106 A non-transitory computer readable medium according to aspect 24 and optionally in accordance with aspect 105, wherein the non-transitory computer readable medium is in accordance with aspect 59 and/or aspect 77, wherein the or each shell portion of aspect 24 corresponds to respective primary portion(s) of aspect 59 or 77 respectively.

Aspect 107 A non-transitory computer readable medium according to aspect 25 and in accordance with aspect 43, wherein the or each shell portion of aspect 25 corresponds to respective primary portion(s) of aspect 43, and the or each free portion of aspect 25 corresponds to the or each secondary portion or secondary member of aspect 43.

Aspect 108 A non-transitory computer readable medium according to aspect 25 and optionally in accordance with aspect 107, wherein the non-transitory computer readable medium is in accordance with aspect 60 and/or aspect 78, wherein the or each shell portion of aspect 25 corresponds to respective primary portion(s) of aspect 60 or 78 respectively.

Aspect 109 A method in accordance with any of aspects 26-33, wherein the method is in accordance with any of aspects 44-52 and/or any of aspects 61-69.

Aspect 110 A woven structure in accordance with any of aspects 34-41, wherein the woven structure is in accordance with any of aspects 53-58 and/or aspects 70-76.

Aspect 111 A non-transitory computer readable medium according to aspect 42, wherein the non-transitory computer readable medium is in accordance with aspect 59 and/or aspect 77.

Aspect 112 A non-transitory computer readable medium according to aspect 43, wherein the non-transitory computer readable medium is in accordance with aspect 60 and/or aspect 78.

Aspect 113 A method in accordance with any of aspects 44-52 and any of aspects 61-69.

Aspect 114 A woven structure in accordance with any of aspects 53-58 and aspects 70-76.

Aspect 115 A non-transitory computer readable medium according to aspect 59 and aspect 77.

Aspect 116 A non-transitory computer readable medium according to aspect 60 and aspect 78.

BRIEF DESCRIPTION OF THE DRAWINGS

Embodiments will now be described by way of example only with reference to the accompanying drawings, which are purely schematic and not to scale, and in which:

FIGS. 10a-10e schematically show pairs of various pairs of binding stacks;

DETAILED DESCRIPTION OF THE DISCLOSURE

Figure 1A:
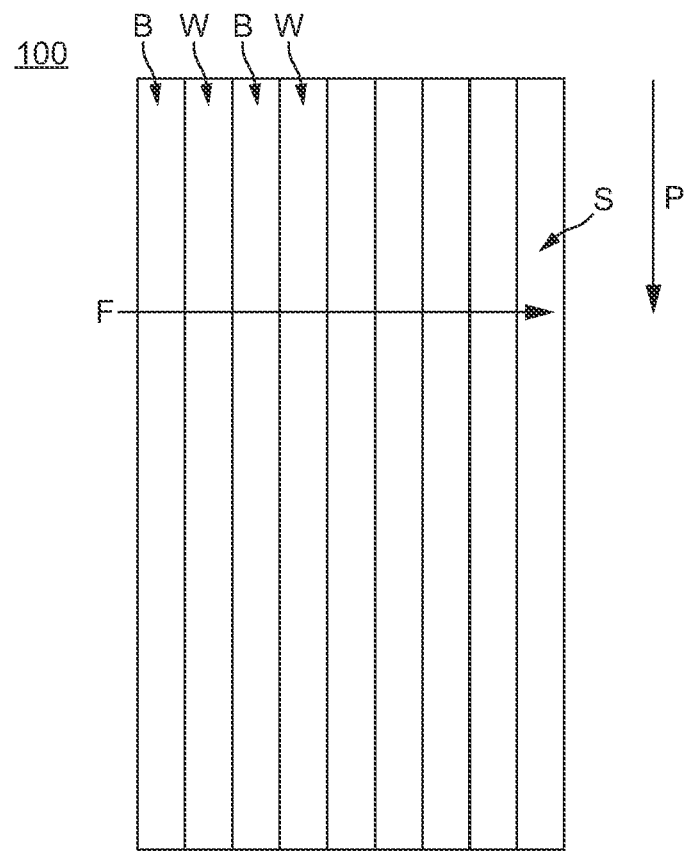
FIGS. 1a-1c schematically show views of an example woven preform.

The expression "tow" as used herein refers to a bundle of fibre reinforcement material. In the context of a woven preform or woven structure, the tow is the smallest element of the weave structure to be manipulated to form the weave (as the individual fibres are not manipulated independently of each other). The tow weight as described herein may be characterized by the weight per unit length or by the number of fibres. The tow weight may be variable or may be constant between tows.

A woven preform as described herein is an intermediate product in a composite manufacturing process, for subsequent forming into a near net shape for the component by resin infusion (e.g. resin transfer moulding) and curing etc. The woven preform may be "pre-preg" (i.e. may comprise pre-impregnated fibre reinforcement material).

A woven structure as described herein encompasses both a woven preform and a formed component having a corresponding woven structure. In this disclosure, all examples of a composite component comprise a woven structure. The expression "component" implies that the woven structure has been formed to the near net shape for the component (and/or finished to adopt the net shape of the component). Net shape is the intended geometry of the component, and is a term of the art. A composite component comprising a woven structure as described herein may be provided, based on a woven preform, by any suitable method. Example methods include a resin transfer moulding (RTM) process in which a matrix material (such as an epoxy resin or any other suitable matrix material as are known in the art) is infused in the woven structure to provide a composite component of matrix material and fibre-reinforcement material.

As is known in the art, different weaves (i.e. different weave patterns or designs) can be used to achieve different properties of a woven structure. For example, weaves with relatively more interlacing between warp and weft tows may generally be more stable and less compliant to adopt different shapes, whereas weaves with relatively less interlacing between warp and weft tows may generally be less stable and more compliant. Such interlacing tends to result in crimping of tows as they pass under or over the respective other tow, and each crimping location may increase a resistance to relative movement between tows (e.g. by elevated friction). As a simple example, "satin" weaves have a relatively high float number (the number of tows of one type over which a tow of the other type extends between interlacing or crimping locations) compared to some other weave types such as a plain weave. Such "satin" weaves therefore have a reduced stability and are more compliant, and are known in the textile industry to provide an improved drape (i.e. being compliant to conform easily to a shape). Similar concepts apply to more complex structural weaves, including multi-layer weaves. While the expression "stability" is used in the relevant art to refer to the compliance of a weave structure, for the purposes of this disclosure it may be considered to be interchangeable or equivalent to a stiffness or flexural rigidity (as may be assessed by reference to a flexural modulus or bending modulus of elasticity).

In a multi-layer weave, there are multiple layers of weft tows extending along a weft direction and layered in a thickness direction of the weave, with warp tows extending along a substantially orthogonal warp direction at respective locations along the weft direction.

Figure 1B:
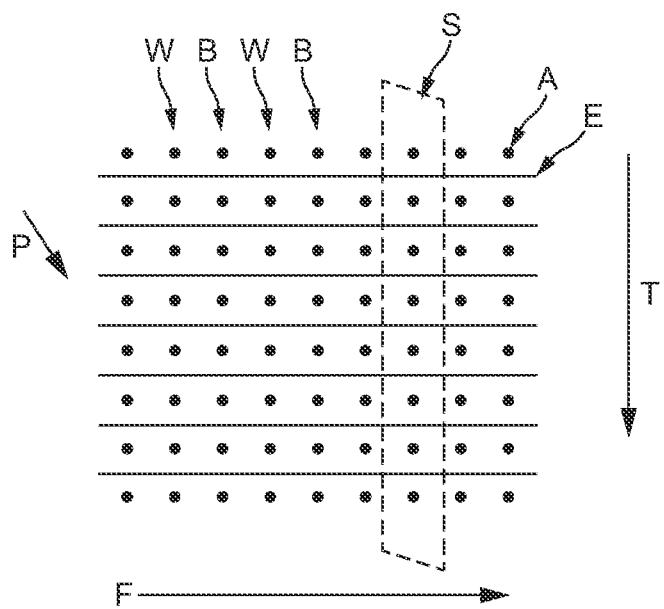

To aid the further discussion of multi-layer weaves, selected weave terminology is discussed below with reference to FIG. 1 (comprising FIGS. 1a-1f). FIG. 1a shows an example mufti-layer woven structure 100 comprising a plurality of stacks S which extend along a longitudinal direction P and each have a notional width along a weft direction F, each stack having one or more warp tows A (as shown in FIG. 1b) which extend along the longitudinal direction within the respective stack (in superposition if there are multiple warp tows). The longitudinal direction may be interchangeably referred to as a warp direction in the present disclosure. FIG. 1b shows a cross-sectional slice of the woven structure 100 normal to the warp direction P at a longitudinal position, and shows that the woven structure 100 further comprises a plurality of weft tows E extending along a weft direction F. The weft tows E are layered in a thickness direction T of the weave, and in this example are provided in a plurality of weft tow layers, each weft tow layer comprising an array of weft tows distributed along the longitudinal direction of the weave so that respective tows are in superposition at respective longitudinal positions.

Each location along the weft direction F occupied by one or more warp tows A superposed on each other through the thickness direction T is referred to herein and in the art as a "stack" S, such that there are a plurality of stacks S defined along the weft direction F by respective sets of one or more warp tows A. A suitable configuration of stacks S in a multi-layer weave is to provide an alternating arrangement of warp (or non-binding) stacks W and binding stacks B, with binding stacks B being stacks in which the or each warp tow A is interlaced with weft tows E (i.e. moving between layers of weft tows, or moving between warp tow positions defined between such layers) to bind the weft tows E, whereas warp (or non-binding) stacks W are stacks in which the or each warp tow A extends without interlacing with weft tows E (e.g. remaining between the same two layers of weft tows E, or remaining at the same warp tow position).

As shown in FIG. 1b, in a mufti-layer weave the interlacing of weft tows means that along the longitudinal direction, the position of each warp tow moves between weft tow layers. Accordingly, at any particular longitudinal direction the upper and/or lower warp tows may not extend over (i.e. on an outer side of) the uppermost or lowermost weft tow respectively. This is manifested in FIG. 1b, which shows a pattern of unoccupied gaps for warp tows in binding stacks, corresponding to a weave pattern for the binding stacks as will be further described below.

Figure 1C:
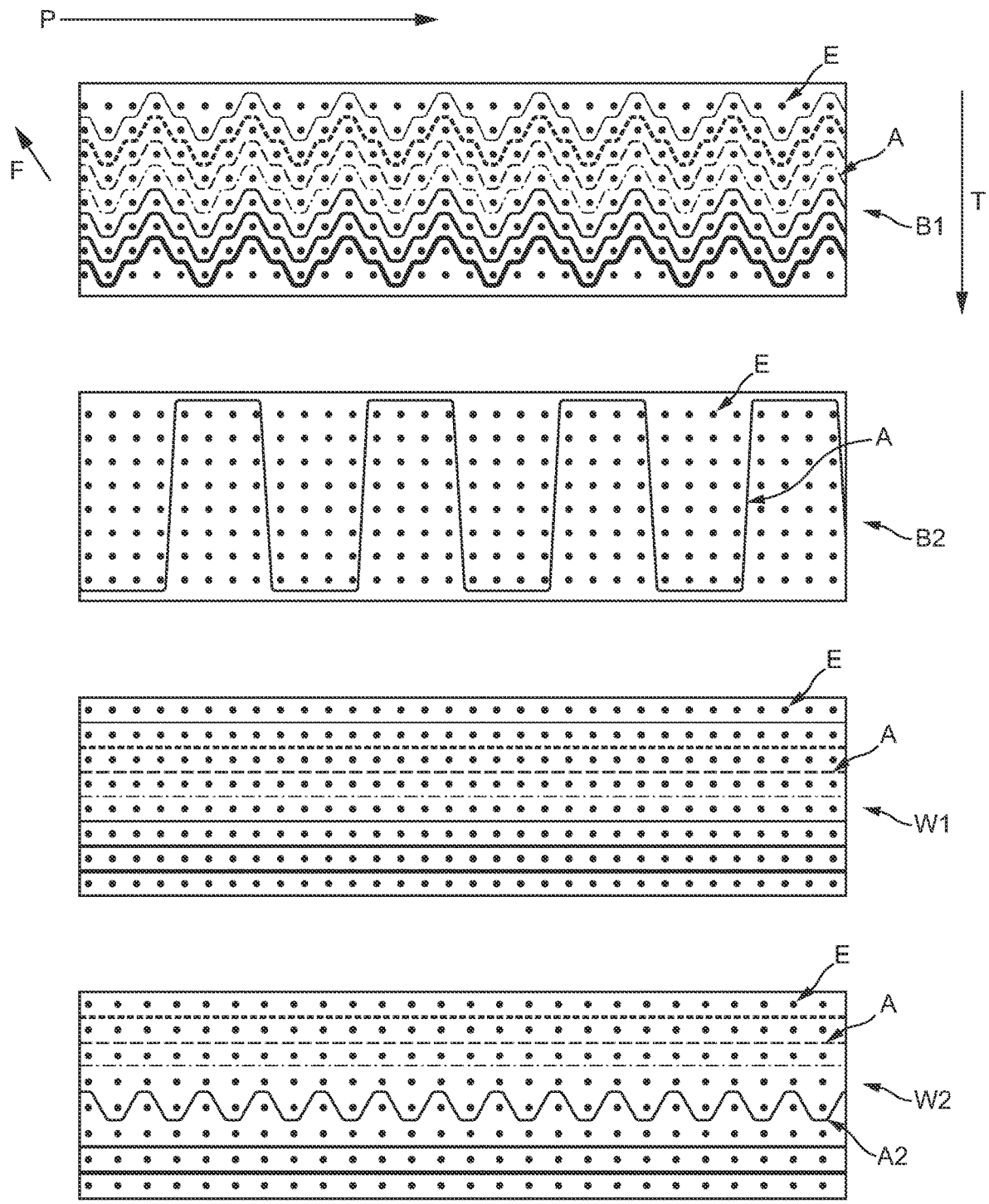

Various stack arrangements are shown in FIG. 1c, each of which show cross-sectional slices of the woven structure 100 normal to the weft direction F at lateral positions along the weft direction F (which extends into the page). In order, there is shown a first binding example stack B1, a second example binding stack B2, a first example warp (or non-binding) stack W1, and second example warp (or non-binding) stack W2.

In the binding stacks B1 and B2, one or more warp tows A extends through the thickness direction T of the woven structure between opposing sides to define a multi-layer weave pattern. In the first binding stack B1, the multi-layer weave type is a layer-to-layer angle interlock weave comprising seven binding warp tows A which extend through eight weft tow layers E. In the second binding stack B2, the multi-layer weave type is an orthogonal through-thickness weave having a float number of four, meaning that the (single) binding warp tow A extends through the thickness (in this example eight layers of weft tows E) in the thickness direction T of the woven structure, and passes in the warp direction P over four weft tows E before returning. A further example of a through-thickness weave (comprising a single binding warp tow) is through thickness angle interlock weave, as is known in the art.

In contrast, in the first example warp stack W1, the warp tows A extend along the warp direction P at constant warp tow positions with respect to the thickness direction T of the weave (i.e. each warp tow position being a position defined between adjacent weft tow layers). As such, there is no binding between the warp A and weft tows E, and the stack may be termed a "non-binding" stack.

In the second example warp stack W2, the warp tows A are generally arranged as in the first warp stack W1, with the exception of a centrally-located warp tow A2 which is interlaced between two adjacent warp tow positions. Nevertheless, this warp tow does not act to bind two adjacent weft tow layers together, and so may be considered to be non-binding. In the present disclosure, a stack in which a majority of the warp tows are non-binding may be considered a non-binding stack.

An example apparatus which may be used for manufacturing a woven structure as disclosed herein comprises a warp tow supply and a loom. The warp tow supply is configured to supply warp tows A to the loom for weaving with weft tows E at a weave location of the loom. The warp tow supply may comprise a plurality of separate tow supply feeds (e.g. separate tow spools on a creel) each configured to independently supply separate warp tows A to the weave location of the loom.

The loom is configured to weave a woven structure, at a weaving location of the loom, using the warp tows A supplied in a longitudinal direction (corresponding to the warp direction P) from the warp tow supply and weft tows E supplied along a generally transverse direction (corresponding to a weft direction F) at the loom. The loom may be of any suitable type as is known in the art, suitable for weaving a multi-layer woven structure. For complex weaves the loom may be programmable (i.e. configured for computer control) to form woven structures with weave patterns based on computer-readable instructions. Such a loom may be referred to as a computer-controlled jacquard loom. The apparatus comprises a loom controller for controlling the loom to weave the woven structure.

As is known in the art, a loom can be controlled to separate respective sets of warp tows A to define an opening for insertion of a weft tow E between them. For example, a set of warp tows A may be lifted to an upper side of the opening so as to pass over the weft tow E, whereas another set may extend below the opening so as to pass under the weft tow E. After insertion of the weft tow E, the same or different sets of warp tows A can then be repositioned to define another opening for reception of a weft tow E.

The woven structure produced by the loom may be referred to herein as woven preform to reflect that it forms an integral part of the component but must be formed to shape and subsequently cured with matrix material (e.g. by a resin transfer moulding (RTM) technique) to form the component.

The woven preform may be referred to herein as having a longitudinal direction corresponding to the path along which it is discharged from the loom, and a lateral direction orthogonal to the longitudinal direction and extending across the woven preform. The longitudinal direction may correspond to the warp direction P of the woven preform (i.e. along which warp tows generally extend). The lateral direction may generally correspond to a weft direction F of the woven preform, while acknowledging that weft tows E may depart from a direction that is precisely orthogonal to the longitudinal and/or warp directions. The weft tows E are interwoven with warp tows A at multiple lateral positions along the weft tows E.

The examples will be described by reference to a component for a gas turbine engine, in particular a stator vane and/or stator vane segment. It will be appreciated that the disclosure herein may be applicable to other gas turbine engine and aerospace components, or other components in other fields.

It will be appreciated that a woven structure as described herein is implemented in a woven preform and wholly or substantially maintained in a composite component comprising the woven structure and a matrix material (considering that trimming processes may be applied to the woven preform), and as such the following description is with reference to a woven structure per se, rather than with reference to a particular stage of manufacture.

As described herein, a woven preform according to the disclosure may be suitable for forming a complex component. The disclosure envisages a woven preform comprising multiple adjacent portions which are longitudinally-separated (i.e. along the warp direction P), with each portion corresponding to a respective part of a complex component. The plurality of adjacent longitudinally-adjacent portions may each have a set of common warp tows extending through the plurality of portions. By varying the weave type and thickness of the interlayer weave between the portions, the respective portions can be configured to have different properties suitable for forming the respective parts of the component. The regions where longitudinally adjacent portions meet may be referred to herein as junctions. This disclosure provides teaching relating to forming a complex product with one or more junctions between members.

As will be described in further detail below with respect to specific examples, each portion of a woven preform according to the disclosure may have a single free leaf, or two or more free leaves in superposition. Each free leaf may comprise a multi-layer weave and is free to separate from another free leaf of the same portion throughout the longitudinal extent of the portion.

The woven preform may be configured to transition from a generally flat shape (as produced by the loom) to a forming shape in which the portions deflect from their woven configuration to adopt a near net shape of component. The woven preform may comprise a primary portion comprising a single free leaf and a secondary portion comprising two free leaves. The two free leaves of the secondary portion may be separated to form a near net shape for the component.

In this way, an integrated complex structure having a 3D weave can be formed, without the need for joining/attachment processes to join respective sections.

Figure 2A:
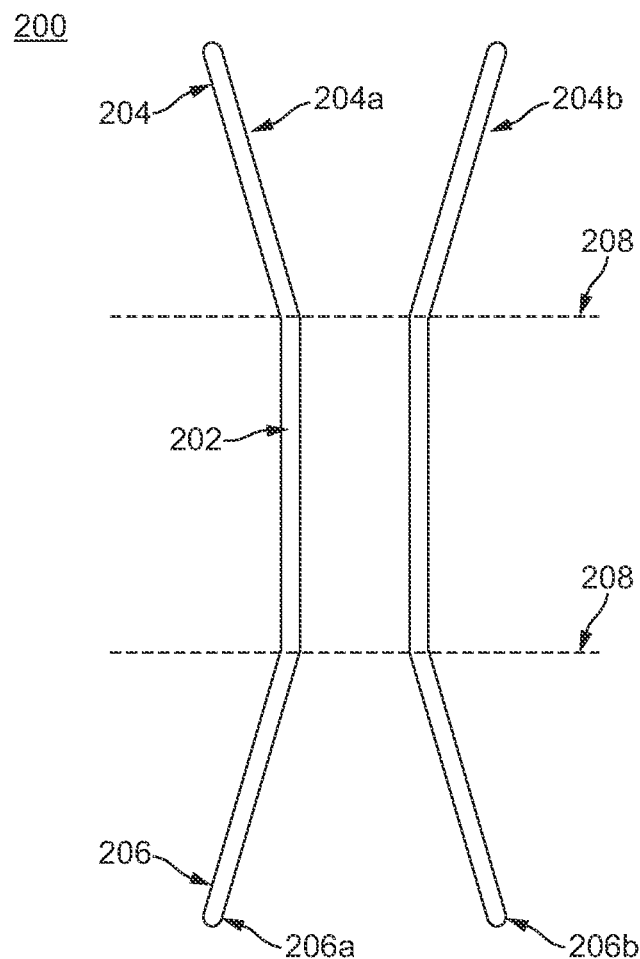
FIG. 2a schematically shows a side-view of a woven preform prior to a shaping step.
Figure 2B:
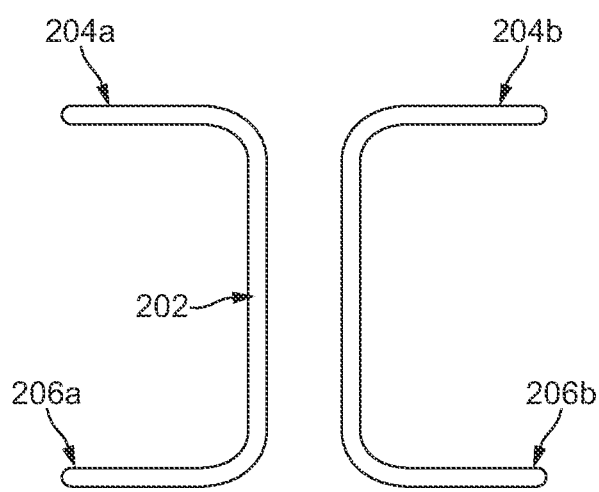
FIG. 2b schematically shows a side-view of a woven preform after a shaping step.

Referring now to FIG. 2 (comprising FIGS. 2a and 2b), a woven structure 200 for a stator vane with root and tip platforms will be described. FIG. 2 shows a cross section through the woven structure 200, normal to a lateral or weft direction. The woven structure 200 comprises a primary portion 202 and two secondary portions 204, 206. The primary portion 202 corresponds to an aerofoil section of the vane, and the secondary portions 204, 206 each correspond to a platform (such as a tip and a root of the vane respectively). The primary portion 202 and the secondary portions 204, 206 meet at junctions 208 along a longitudinal direction of the woven structure. Although the primary portions 202 and the secondary portions 204, 206 are shown at meeting at an angle at the junctions 208 (for ease of showing the different portions in the Figures), it will be understood that the woven structure 200, after being formed by the loom, is a substantially planar arrangement.

The primary portion 202 may be solid or hollow, and may be a shell portion as will be described in further detail below.

In this example, the primary portion 202 comprises a single free leaf. The cross-section of FIG. 2a shows what appears to be two leaves of the primary portion that are not joined at the respective lateral position of the cross-section. However, as will be discussed below, the primary portion is actually made of a single free leaf, and what FIG. 2a shows is two sections of the same free leaf. The two sections are joined in the primary portion out of the plane of the figure (e.g. at edges of the primary portion not shown in the cross-section of FIG. 2a). Therefore the primary portion 202 of this example does not comprise a plurality of free leaves, but rather a single free leaf.

The secondary portions 204, 206 each comprise two free leaves 204a, 204b, 206a, 206b. The expression "free leaf" or "free leaves" is used to indicate that the respective elements of the woven structure are separable from one another at locations away from the junction 208, despite being woven at the same longitudinal position of a woven preform using a multi-layer weave. Unlike the primary portion 202, the free leaves 204a, 204b, 206a, 206b at each secondary portion 204, 206 are not joined to each other.

FIG. 2b shows a cross-section of the woven structure 200 after a shaping process to adopt a near net shape for the component. In this drawing, the two leaves of the primary portion 202 are shown in the figure as being separated along a thickness direction at the lateral location of the cross-section (but as explained previously, they are actually joined elsewhere in the primary portion, as will be discussed further below). The free leaves of the secondary portions 204, 206 have been shaped to adopt a near net shape of the respective platforms (the tip and root section respectively) of the vane.

Figure 3A:
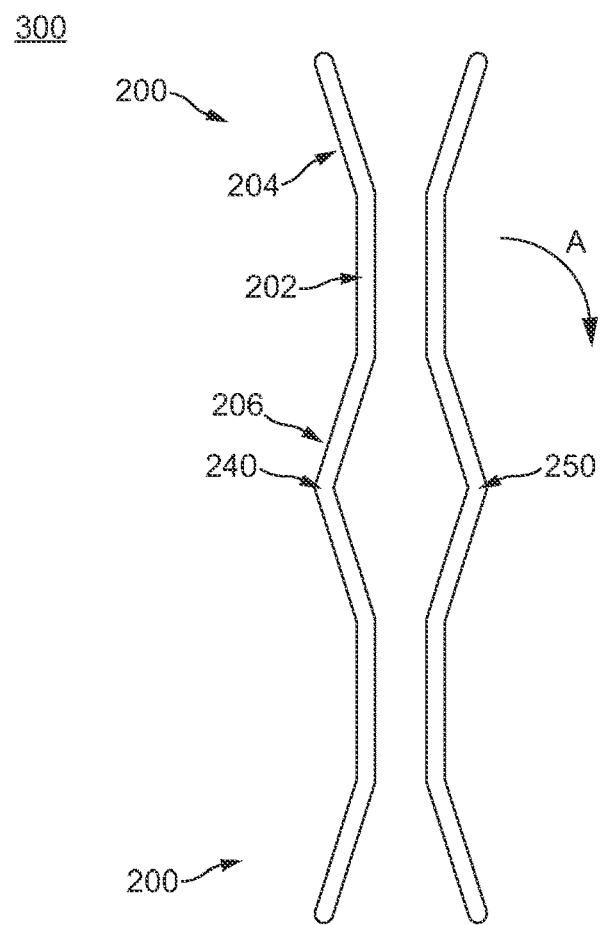
FIG. 3a schematically shows a side-view of a twin section of a woven preform prior to a shaping step.
Figure 3B:
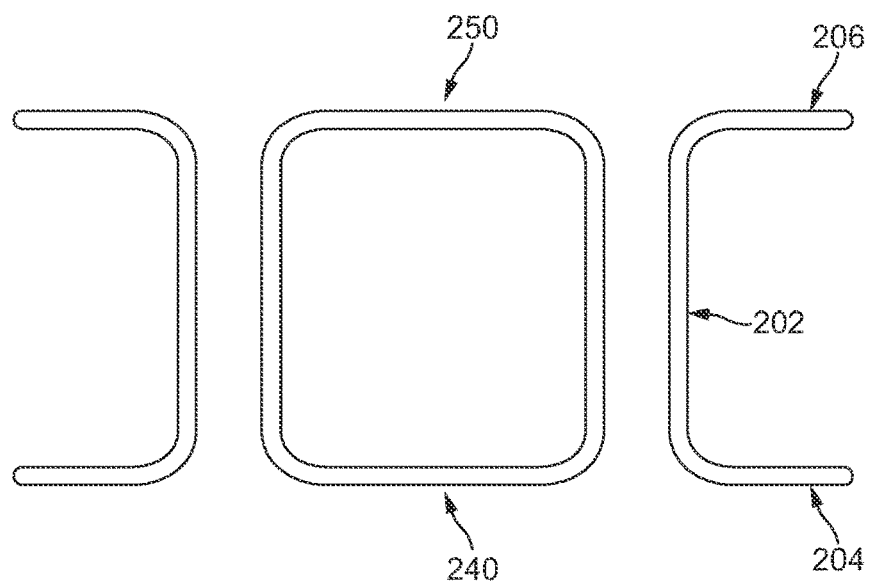
FIG. 3b schematically shows a side-view of a twin section of a woven preform after a shaping step.

As shown in FIG. 3 (comprising FIGS. 3a and 3b), the woven structure 200 as shown in FIG. 2 may be part of a woven structure 300 comprising a repeating unit which is joined end-to-end in a continuous woven structure. In this way it will be understood that a section comprising a plurality of vanes can be made from a single woven preform.

For instance, the woven structure 300 shown in FIG. 3 comprises two woven structure units 200, each of which corresponds to the woven structure described above with reference to FIG. 2. As above for FIG. 2, it will be understood that the woven structure 300, when formed by the loom is substantially planar, and the junctions are only shown here at angles for ease of reference to each adjacent section.

To form the woven structure 300 into the near net shape as shown in FIG. 3b, the woven structure 300 can be cut at a cut point 240, whilst remaining attached at a join point 250. The top half (or one longitudinal end portion) of the woven structure 300 (comprising a single woven structure unit 200) can then be moved relative to the lower half of the woven structure 300 (e.g. in the direction of the arrow A), and the two leaves of each of the secondary portions can be separated as described above. If the upper portion of FIG. 3b corresponds to a tip of the vane and the lower portion corresponds to the root, then it will be appreciated that to form a continuous root platform between the two units only requires a single join between distal ends of opposing free leaves of the secondary portions 204, 206, at a new lower join point 250. In this way, the woven structure 300 is formed into a near net shape for a complex component in which two members (e.g. two vanes) extend between two support structure (e.g. two platforms), as shown in FIG. 3b.

Although the woven structure 300 shows only two such woven structure units 200 and corresponds to only two vanes, it will be understood that, by repeating the structure 200 in a longitudinal direction and cutting at suitable cut regions on alternating sides of the woven structure 300, a vane segment comprising any number of multiple vanes can be formed by "unfolding" the woven structure units in a 'concertina' fashion.

In some examples, the vane may be a ribbed vane (i.e. with one or more support beams bridging the aerofoil surfaces). The rib may only extend along a mid-portion of the span, thereby terminating in the respective primary portion 202 before the respective junctions 208 with secondary portions 204, 206 that form the respective platforms. This may avoid forming defects that could occur in a transition between a platform (such as a root or tip) and fully-ribbed vane.

In this example, each of the primary and secondary portions 202, 204, 206 of the preform 200 comprises a multi-layer weave structure. Examples of multi-layer weave structures which may provide these properties will now be described with reference to FIG. 4 (comprising FIGS. 4a and 4b).

Figure 4A:
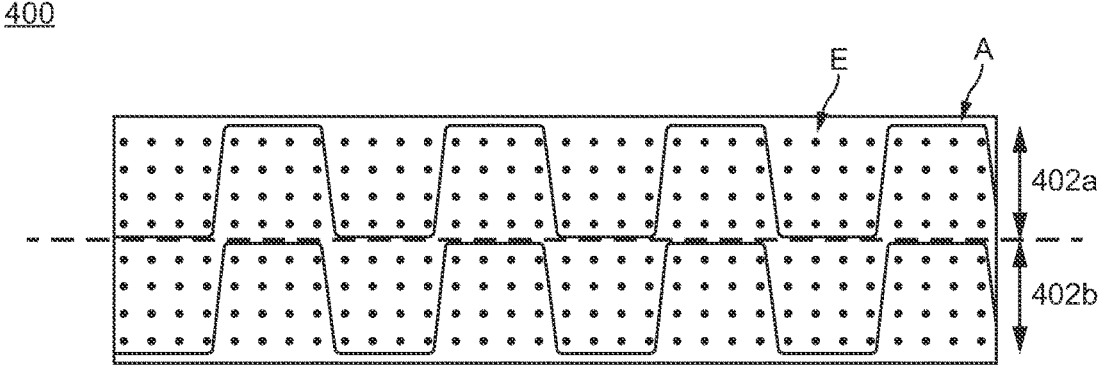
FIG. 4a schematically shows two types of two-leaf binding stacks.
Figure 4A:
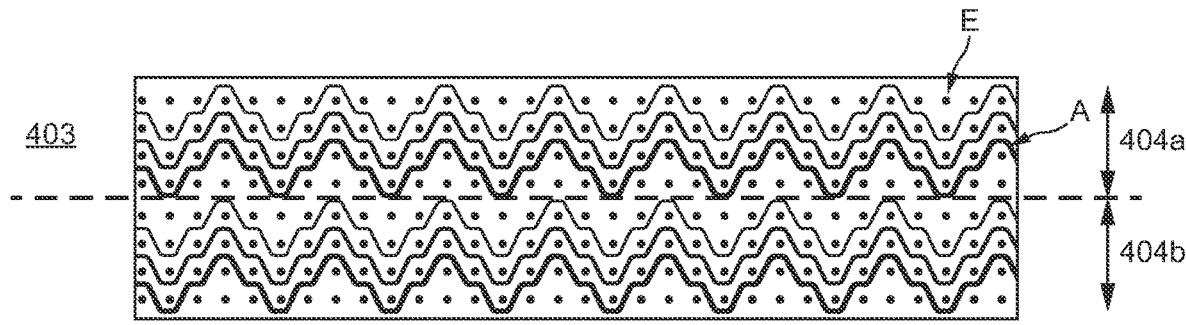

In the secondary portions of a preform 200 as described above, binding warp tows A in binding stacks of the weave may only extend between warp tow positions associated with the respective leaf, such that the leaves are not interwoven and remain separable. Two examples of such weave structures are shown in FIG. 4a, in which the two leaves of each example 400, 403 are marked 402a, 402b, 404a and 404b respectively. It can be seen that each binding stack for the respective pairs of leaves 402a, 402b, 404a, 404b has two separate sets of one or more binding warp tows A associated with respective halves of the woven structure corresponding to the leaves. Each set of binding warp tows A extend between warp tow positions across the entire thickness of the respective leaf to bind the respective weft tows, but do not transition into warp tow positions associated with the other half (i.e. the other leaf). This permits the respective leaves to be separatable after weaving.

In the first example 400, the leaves 402a, 402b each comprise an orthogonal through-thickness weave (where the expression "thickness" in this instance refers to the thickness of the leaf, not the woven structure as a whole) extending through the thickness (in this example four layers of weft tows E), with a float number of four (i.e. extending over four weft tows E before returning, as described above with respect to FIG. 1c). In the second example 403, each leaf 404a, 404b comprises a layer-to-layer angle interlock weave for three binding warp tows A through four layers of weft tows E, as described above for FIG. 1c. It will be appreciated that other binding stack arrangements may be used, and that each leaf 402a. 402b, 404a, 404b may comprise different types of weave, or a different number of warp tows A or weft tows E, depending upon the requirements of the woven structure to be formed.

Figure 4B:
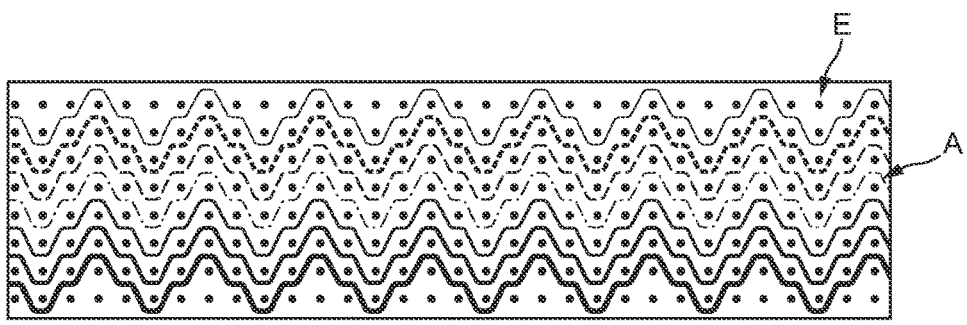
FIG. 4b schematically shows a one-leaf binding stack.

In contrast, in the primary portion, at least some (e.g. all) of the binding stacks are bound throughout the thickness of the woven structure, by one or more binding warp tows which extend throughout the thickness of the portion. One suitable example weave structure is shown in FIG. 4b, which shows a layer-to-layer angle interlock weave for seven binding warp tows A through eight layers of weft tows E. As above, it will be understood that the number of warp A and weft tows E may be varied according to the desired thickness and properties of the primary portion.

Although a woven structure and woven preform has been described above with respect to primary and secondary portions having different numbers of free leaves, the disclosure envisages other types of woven preforms and woven structures having one portion (e.g. only a primary portion), or any number of multiple portions, as will become clear from the following description.

Figure 5:
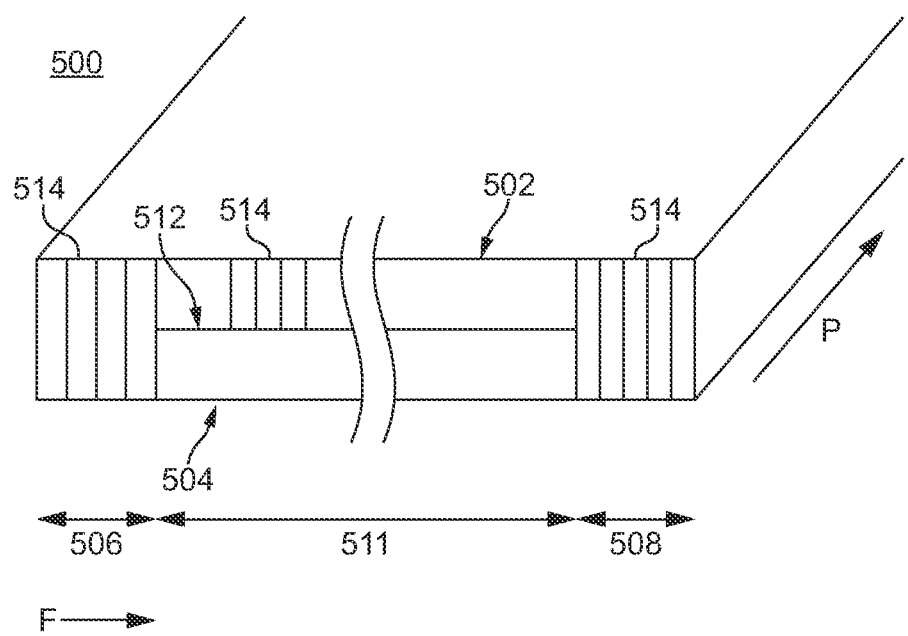
FIG. 5 schematically shows a cross-section of a shell portion of a woven preform.
Figure 6:
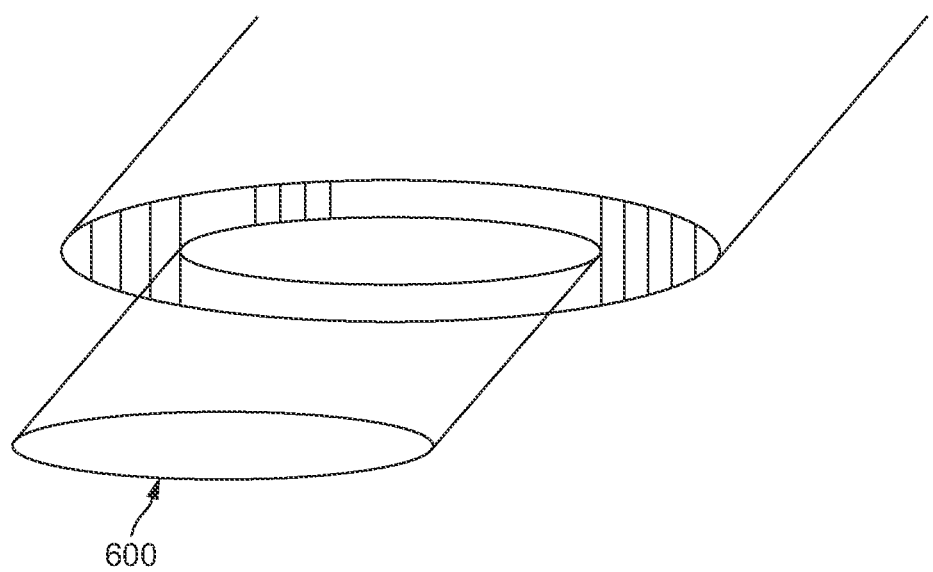
FIG. 6 schematically shows a cross section of the shell portion of FIG. 5, as shaped by a mandrel.

FIG. 5 is a cross-sectional view of a shell portion 500 of a woven preform which may be used for forming a hollow aerofoil portion of a vane. The shell portion 500 is woven as a substantially planar woven preform comprising two superposed leaves 502, 504, each leaf 502, 504 having a multilayer weave substantially as described above. The leaves 502, 504 are bound at two edge regions 506, 508 such that the shell portion 500 as a whole forms a single leaf (according to the terminology set out above). In a central region 511 of the shell portion, the leaves 502, 504 are not bound to each other and are therefore free to separate from each between the edge regions 506, to form an inter-leaf channel 512 therebetween (as best shown in FIG. 6). To form the shell portion, binding stacks 514 in the edge regions 506, 508 bind weft tow layers of the respective leaves together, whereas binding stacks 514 in the central region 511 do not bind weft tow layers of the respective leaves together. The stacks are schematically illustrated in FIG. 5 as the through-thickness extent by which the binding warp tows extend in the respective stack, and while only a minority of stacks are shown for clarity of the drawing, it should be appreciated that there is a full array of stacks along the lateral direction of the woven structure.

In this example, the edge regions 506, 508 correspond to a leading or trailing edge of a vane. The weave arrangement (i.e. the stacks) in the edge regions 506, 508 will be described in further detail below.

The shell portion 500 has a longitudinal extent along the longitudinal direction (or warp direction) P corresponding to a span of the aerofoil portion of the vane. This corresponds to a direction along which a preform comprising the shell portion 500 would be drawn during a manufacturing process. The shell portion 500 has an orthogonal lateral direction F, corresponding to a chordwise direction of the vane (which may generally correspond to a weft direction of the shell portion 500).

The bound edge regions 506, 508 of the shell portion 500 are at lateral sides of the shell portion 500. In this example, the bound edge regions 506, 508 primarily extend along the entire longitudinal extent of the shell portion 500, although in other examples the edge regions may terminate before the longitudinal extremes of the shell portion 500 (for example to permit further separation of the leaves there). Accordingly, the edge regions 506, 508 have a component in the longitudinal direction which is much greater than a component in the lateral direction F. In the edge regions 506, 508, binding tows extend between the leaves 502, 504 to join the leaves together as will be described in further detail below with reference to FIGS. 8 and 9.

As shown in FIG. 6, a forming element, in this example a mandrel 600 which has a near net surface corresponding to a desired shape of an internal surface of the vane, may be placed between the leaves 502, 504 into the inter-leaf channel 512 of the shell portion 500, to form the shell portion 500 into the near net shape.

The expression "near net surface" is a term of the art, and is intended to refer to the mandrel defining a profile which is close to the final shape of the composite component to be manufactured (e.g. except for relatively minor finishing and machining), such that the reader understands that the action of forming the woven preform into the shape of the component is conducted by applying the preform to the mandrel (or inserting the mandrel in the preform).

The mandrel 600 may have a tapered end for insertion into the inter-leaf channel, and a forming portion for locating in the inter-leaf channel 512 and defining the near net surface. The forming portion is the portion of the mandrel which causes the shell portion 500 to adopt a near net shape for the component as described above.

Figure 7A:
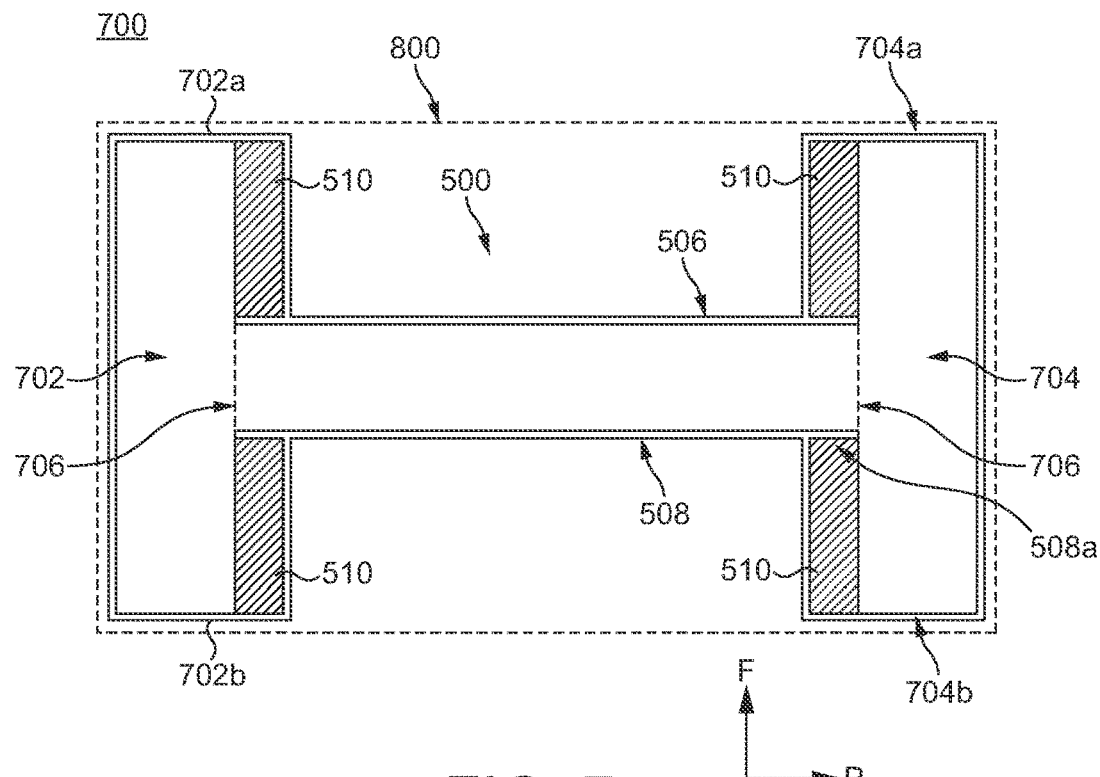
FIG. 7a schematically shows a plan view of an example woven preform.

FIG. 7*a* shows an example woven structure 700 (a woven preform) which includes a shell portion 500 as described above, together with two free portions 702, 704, each longitudinally adjacent to an end of the shell portion 500. The free portions 702, 704 substantially correspond to the "secondary portions" as described above with reference to FIGS. 2-4, whereas the shell portion substantially corresponds to the "primary portion" as describe above with reference to FIGS. 2-4.

As shown in plan view (i.e. normal to a thickness direction of the woven preform), the woven preform 700 is substantially the shape of a dumbbell, or an English capital I (with serifs) or H. The woven structure 700 is shown after a trimming operation in which portions of the preform have been removed including trimmed portions laterally adjacent to the shell region 500 on each side and longitudinally between the laterally-protruding regions of the free portions 702, 704. Before trimming, these trimmed portions would define the lateral sides of the woven preform. In this particular example, lateral sides 702*a*, 702*b*, 704*a*, 704*b* of the free portions 702, 704 correspond to the lateral sides of the woven preform, before trimming.

The edge regions 506, 508 extend along the longitudinal extent (length) of the shell portion 500. As can be seen from FIG. 7*a*, the edge regions 506, 508 are laterally offset from lateral sides of the preform (i.e. the untrimmed preform). Accordingly, the free portions 702, 704 generally have a greater lateral extent than the shell portion, and extend laterally beyond junctions 706 between the shell portion 500 and the free portions 702, 704. The free portions 702, 704 each correspond to an integrated platform (such as a tip and a root of the vane respectively).

Each free portion 702, 704 has two opposing free leaves in superposition (not shown in this plan view—best shown in FIGS. 7*b* and 7*c*), each opposing free leaf 708, 710 having a multi-layer weave with warp tows corresponding to, and continuously extending from, a respective leaf of the shell portion 500. The leaves 708, 710 of the free portions 702, 704 are free to separate from one another throughout their longitudinal and lateral extents (i.e. along the span and chordwise directions of the vane), while remaining attached to the respective leaves of the shell portion 500 at the junctions 706. This is best illustrated in FIG. 7*c*, which shows the preform of FIG. 7*a* in perspective view, with the leaves 708, 710 separating from one another away from the shell portion 500, and illustrating how a forming element can be inserted between the leaves 708, 710 and extend through the shell portion. When the shell portion 500 is expanded as noted above, the junction 706 forms a closed loop boundary having two loop segments associated with each of the leaves of the shell portion 500, and the respective leaves 708, 710 extend from these loop segments.

The lateral sides 704*a*, 704*b* of the free portion correspond to lateral sides of the respective portion of the composite component. The above definitions of the shell portion 500 and free portions may apply to the woven preform after any trimming operation to prepare the woven preform for forming the composite component, for example. For example, it may be that the woven preform has trim portions (for removal) at lateral edges of the preform laterally adjacent to the free portions and which bind through a thickness of the woven structure (e.g. binding the respective leaves together). However, after trimming, the respective free leaves 708, 710 would be free to separate from one another throughout their longitudinal and lateral extents.

By forming a preform in this way, hollow components can be formed using a multi-layer weave, without requiring a post-weave join between (i) opposing leaves/portions of the hollow component; and/or (ii) the hollow portion and adjoining support structures, such as the platforms described above. While a simple mandrel is shown in FIG. 6 which may necessitate a non-reentrant geometry (e.g. with a 0 or positive drafting angle to facilitate removal), it is envisaged that more complex mandrels (e.g. with retractable/extendable parts) or an inflatable mandrel may be provided to enable forming of re-entrant geometry.

As shown in FIG. 7*a*, the example woven preform 700 comprises four tab portions 510, each tab portion 510 having a multi-layer weave continuous with and extending longitudinally from a respective leaf 708, 710 of the respective free portion 702, 704. As can be seen in FIG. 7*a*, the tab portions 510 extend longitudinally beyond the unbound boundary 706 (i.e. junction) of the shell portion 500, to be laterally adjacent the shell portion 500. In this example, the tab portions 510 have no warp tows in common with the shell portion 500, but in other examples the shell portion 500 may extend laterally along a mid-span (i.e. away from the junction 706) to have an overlapping lateral extent with one or more tab portions at longitudinal positions away from the tab portions, such that there may be common warp tows between them. Nevertheless, following trimming between the tab portions and the shell portion, would separate the respective portions of the warp tows.

The tab portions 510 in this example are for forming a join with a corresponding tab portion 510 on the opposing leaf (i.e. the tab portion 510 of each leaf 708 and 710 of the free portions are configured to be joined together), as will be further described below. In other examples, the tab portion 510 may be for directly joining with the opposing leaf.

As noted above, the shape of woven preform 700 of FIG. 7*a* reflects a post-weaving trimming operation, and the woven preform 700 is derived from a larger woven preform 800 as originally woven, which is trimmed along edges woven preform 700 (as indicated by the solid lines in FIG. 7*a*) to form the outline of the I shaped woven preform. During the trimming operation, the woven preform 700 is also trimmed between each of the tab portions 510 and the shell portion 500 to define a lateral side of each of the tab portions 510 (and a lateral side of the shell portion 500). Such a trim permits deflection of the tab portions 510 relative to the laterally-adjacent shell portion 500.

Figure 7B:
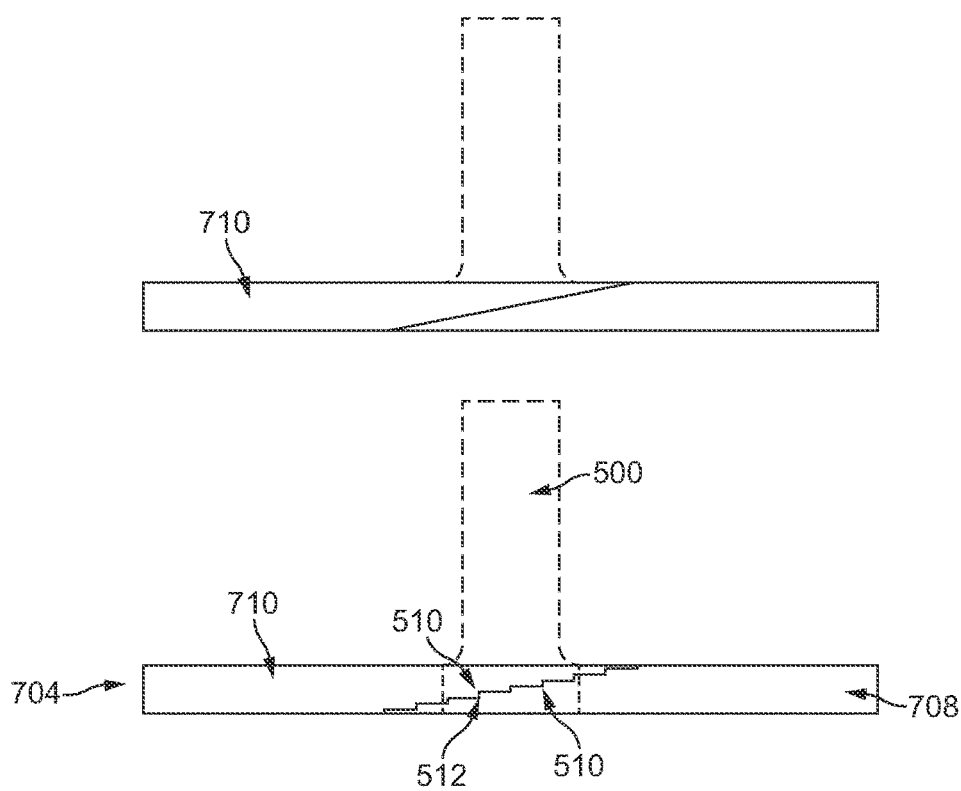
FIG. 7b schematically shows a cross-section of a two types of tab portion of a woven preform in a joined configuration.
Figure 7C:
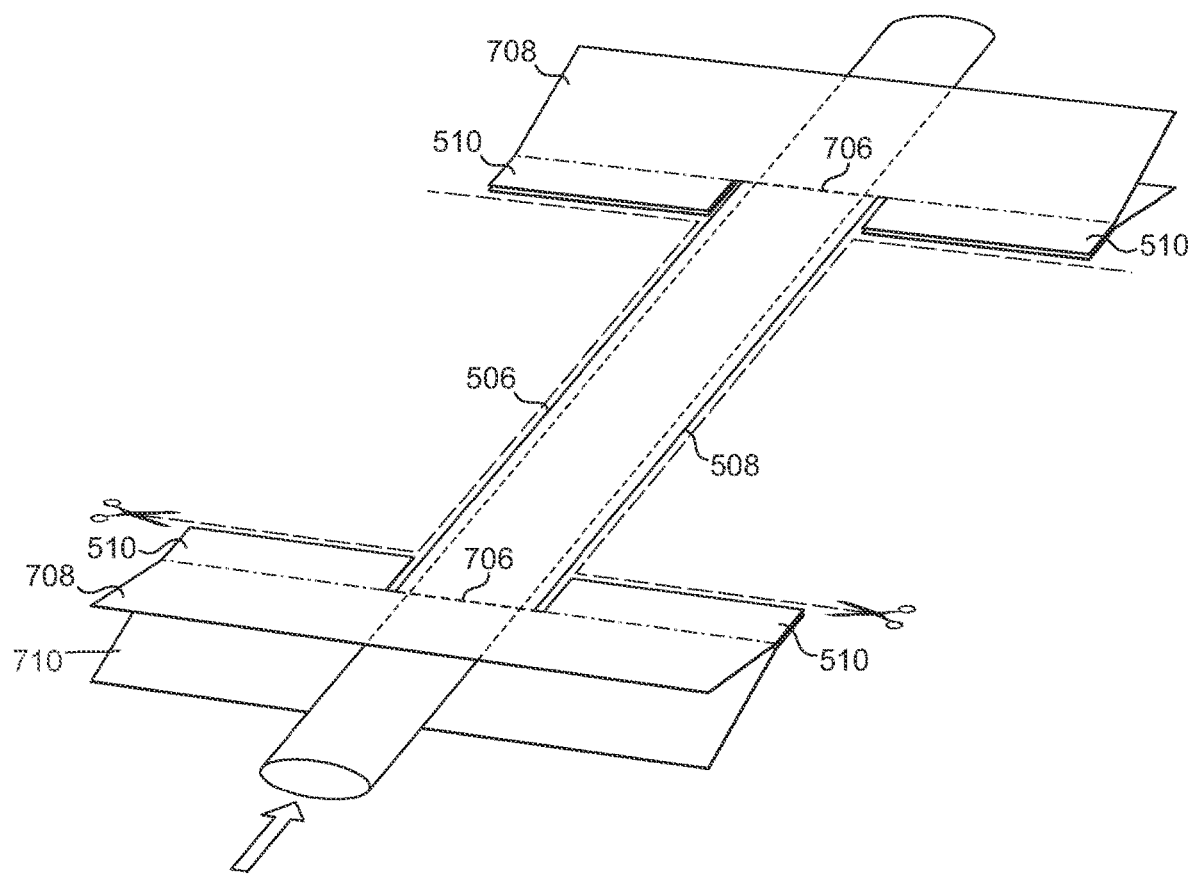
FIG. 7c schematically shows a perspective view of an example woven preform and forming element.

As shown in FIG. 7*b* and in FIG. 7*c*, during manipulation of the free leaves 708, 710 of the free portions, the tab portions 510 are overlaid joined along a join 512. By folding of the free leaves 708, 710 and tab portions 510 relative to the shell portion 500, the platform region is formed.

As can be seen in FIG. 7*b*, in this particular example a thickness of the tab portion 510 tapers in a stepwise manner along the longitudinal extent of the tab portions 510. In this way, a tapered join portion 512 is formed when the tab portions 510 are joined, a tapered join being a join between overlapping portions, one or both of which tapers in thickness along a direction corresponding to an overlapping extent of the join. The tapering of the tab portions 510 results in good structural bond (due to a high contact area) between the tab portions 510 without adding thickness.

The thickness of the tab portions 510 is defined by a weave structure in the tab portion 510, in particular, a multi-layer bound thickness of the woven preform 700. As such, the taper is formed in a stepped structure, corresponding to each layer of the tows. The multi-layer bound thickness is defined by the number of weft tows E bound by binding warp tows A. Accordingly, the thickness of the tab portions 510 can be altered by altering the weave structure, in particular the number of weft tows E bound by binding warp tows A.

Tapering of a thickness of the tab portions may be achieved, for example, by selectively trimming the warp tows at staggered locations along the tab portion, and/or be defining a weave for binding stacks in the tab portions over which a number of weft tow layers bound by the respective binding warp tows progressively reduces. After trimming of free weft tows, this progressively reduces the thickness of the portion.

The joined free leaves 708, 710 and tab portions 510 together form a platform (also known as a support member, e.g., for a root and/or tip of a vane) which is integral with the shell portion 500 (e.g. the aerofoil part of the vane). Although the platforms each comprise two free leaves, when these are joined at the join portion, the resulting platform has relatively high structural integrity.

After forming the shell portion 500 into a near net shape using the mandrel 600 as described above, the leaves 708, 710 of the free portions 702, 704 are separated to form a near net shape for the component, with the free portions 702, 704 forming the platforms (i.e. tip and root) of the vane, as described above with reference to FIG. 2. The free portions 702, 704 can be formed into near net shape using respective portions of a forming structure. In this way, the leaves 708, 710 of the free portions 702, 704 are separated and received on respective portions of the forming structure to adopt the near net shape for the component. The forming structure may also facilitate the superposition and joining of the tab portions 510, and or be configured to maintain the mandrel in a fixed relationship relative to the forming structure.

After forming the woven preform 700 into the near net shape of the component, a resin infusion operation may be conducted on the preform to provide matrix material, and the infused woven structure may then be cured and/or compacted using any suitable procedure as is known in the art. It may be that the tows of fibre-reinforcement material are pre-impregnated with matrix material, permitting forming of the component (e.g. using a compacting and/or curing process) without a resin infusion operation.

A plurality of shell portions 500 (or woven preforms 700 comprising shell portions 500, free portions 702, 704 and/or tab portions 510) may be manufactured as part of a single woven preform 800, to form a vane segment as described above with reference to FIG. 3.

Referring back to FIG. 5, as noted above the example shell portion 500 of the woven preform 700 comprises lateral edge regions 506, 508, which correspond to a leading and/or trailing edge of the vane respectively. It will therefore be appreciated that the edge regions 506, 508 join two leaves 502, 504 as described above (i.e when the desired component is hollow). In other examples, the lateral edge regions 506, 508 may be part of a single leaf which is bound through its thickness along its lateral extent, such that there is no inter-leaf opening for forming a hollow structure.

Figure 8B:
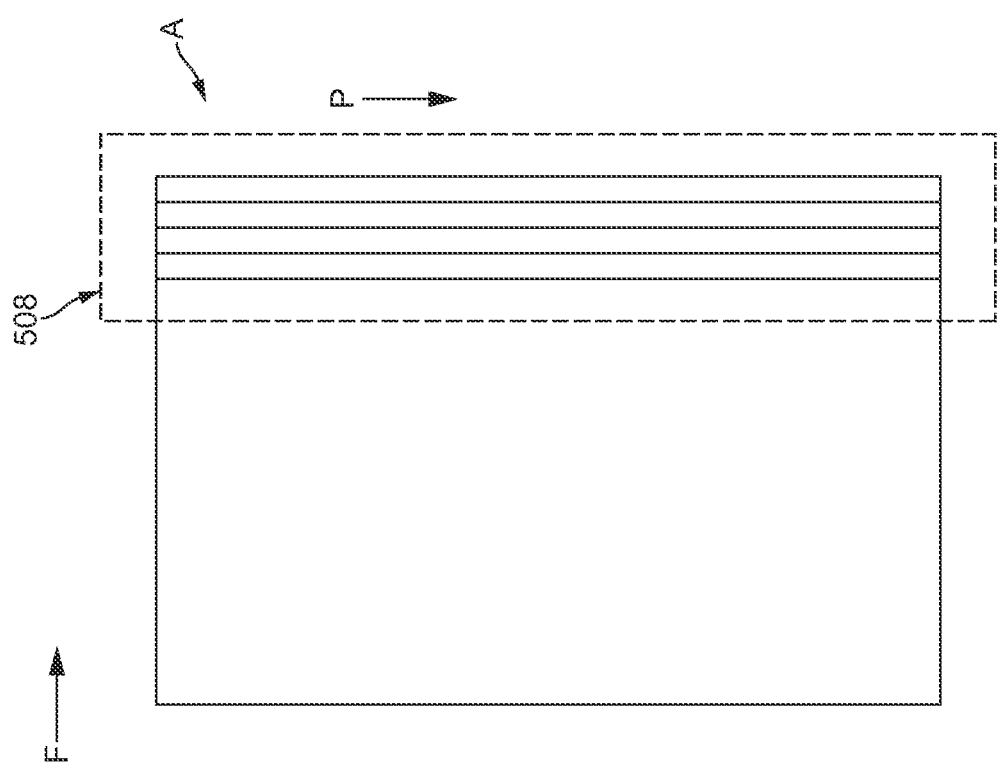
FIG. 8b schematically shows a plan view of the preform.
Figure 8A:
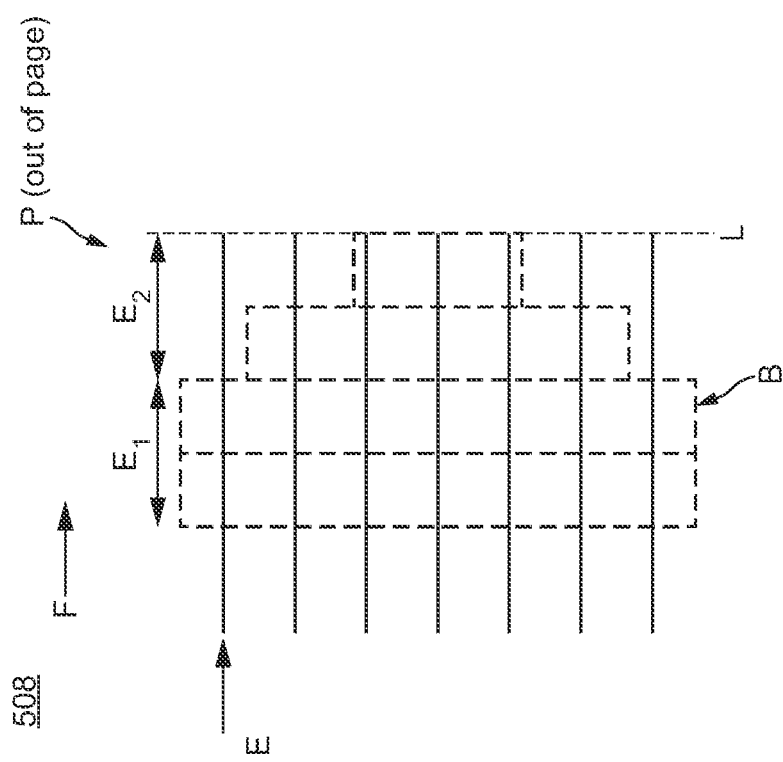
FIG. 8a schematically shows a cross-sectional view of edge region of a woven preform, normal to a warp or longitudinal direction.

A schematic close-up view of the fibre tows in one of the edge regions 508 is shown in FIG. 8*a* (normal to the warp direction), and a schematic plan view is shown in FIG. 8*b* (normal to the thickness direction). It will be appreciated that in FIG. 8*b*, the vertical direction P corresponds to a longitudinal (spanwise) direction of the vane, in which the warp fibres A extend, and the horizontal direction F corresponds to a lateral or transverse (chordwise) direction of the vane, in which weft fibres E generally extend. It will also be appreciated that whilst only one edge region 508 is shown in FIG. 8, the following description is equally applicable to the other edge region 506 of the shell portion 500 of the woven preform 700 as described above.

As can be seen in FIG. 6, the edge region 508 is configured to taper in a thickness direction T towards the respective lateral side. An example arrangement of tows in this region to provide such a thickness reduction will now be described with reference to FIG. 8, which shows a cross-sectional view of the edge region 508 normal to a weft direction.

As previously, the weft tows are indicated by E, and the weft direction is indicated by F. It can be seen that in this example, seven weft fibres E extend in the weft direction F.

As shown in FIG. 5*a*, the shell portion 500 comprises a series of laterally adjacent stacks, each stack extending in the longitudinal (or warp) direction P. Typically, the stacks are arranged in an alternating configuration of warp (non-binding) stacks and binding stacks, as discussed above. Each stack B as shown in FIG. 5*a* corresponds to a warp tow position along the lateral direction F, and similar stack positions are indicated in FIG. 8*a* with reference numeral B. Each stack B comprises one or more warp tows A in superposition within the stack B. In binding stacks, the warp tows A are interlaced with the weft tows of a plurality of weft tow layers to bind the weft tow layers, for example in a layer-to-layer angle interlock weave, as described with reference to B, in FIG. 1*c*. It will be appreciated that in other examples. The weave pattern will be described in more detail below with reference to FIGS. 10 and 11.

The number of weft tow layers bound by (one or a plurality of warp tows in) a respective stack B is defined as a weft binding number. The extent by which a stack binds weft tow layers is schematically illustrated in FIG. 8*a* by the dashed box corresponding to the stack with reference numeral B, such that when a warp tow extends through the dashed box this indicates that the respective stack binds those weft tows (weft tow layers). It can be seen in FIG. 8*a* that from left to right (towards the lateral side of the edge region), the binding stacks B as schematically illustrated generally decrease in weft binding number. In this example, the stacks B from left to right have a weft binding number of 7, 7, 5, 3.

As shown in FIG. 8a, some of the weft tows E towards the upper and lower portions of the weave therefore comprises a bound portion (which is bound by a binding stack B, as indicated by the dashed lines) and an unbound portion which extends laterally beyond a bound region of the stacks B. For example, the weft tow indicated by E in FIG. 8a has a bound portion E1 and an unbound portion E2. It will be appreciated that only a portion of the edge region 508 is shown here and therefore that the bound portion may extend generally further in the direction away from the edge region 508. The weft tow indicated at E can be considered a partially bound weft tow. It can be seen from FIG. 8a that the unbound portion $E_2$ extends toward the lateral side of the shell portion 500, beyond the last respective binding stack (indicated by the stack marked B) by which it is bound. The lateral extent of the unbound portion $E_2$ corresponds to at least one stack B of the multi-layer weave.

After forming of the woven preform 700 comprising the shell portion 500, the woven preform 700 can be trimmed as discussed above with reference to FIG. 7a. FIG. 8a shows the edge region 508 after trimming along the trim line L, such that each of the weft tows (and thereby weft tow layers) layers have a common trimming location which corresponds to a lateral side of the shell portion 500. The present disclosure envisages a single trimming action being conducted for all weft tow layers at a respective longitudinal position, and a trimming action may proceed along the lateral sides of the shell portion in a single action to swiftly perform trimming. With the single trimming line L, the partially bound weft tows E retain their unbound portion E2 after trimming, and any unbound portions E2 are ultimately retained in the formed component by a resin material that encapsulates the fibre reinforcement material. This is in contrast with previously known techniques in which a woven preform may be trimmed at locations corresponding to where they are last bound, to prevent loose ends of weft tows extending beyond a bound portion of the structure. According to such previously-considered methods, the entire unbound portion E2 of weft fibre E would be trimmed. The trimming described herein may be performed with an apparatus to conduct a single trimming action along the trim line L, for example a cutting press. The ability to use such a press for a woven structure that tapers in thickness represents a simplification and efficiency improvement over previously-considered methods which may require that trimming is performed manually or with an intricately programmed robot. Therefore, as a result of the method described herein, the method of manufacture is more reliable and efficient.

A thickness of an edge of a component, formed using the weave structure of the edge region 508 as described above, may reduce towards the respective lateral side of the component despite retention of the unbound portions of the weft tows. For example, as will be described in further detail below, the number of warp tows in successive stacks towards the respective side may reduce, thereby reducing the fibre volume towards the respective side.

Figure 9:
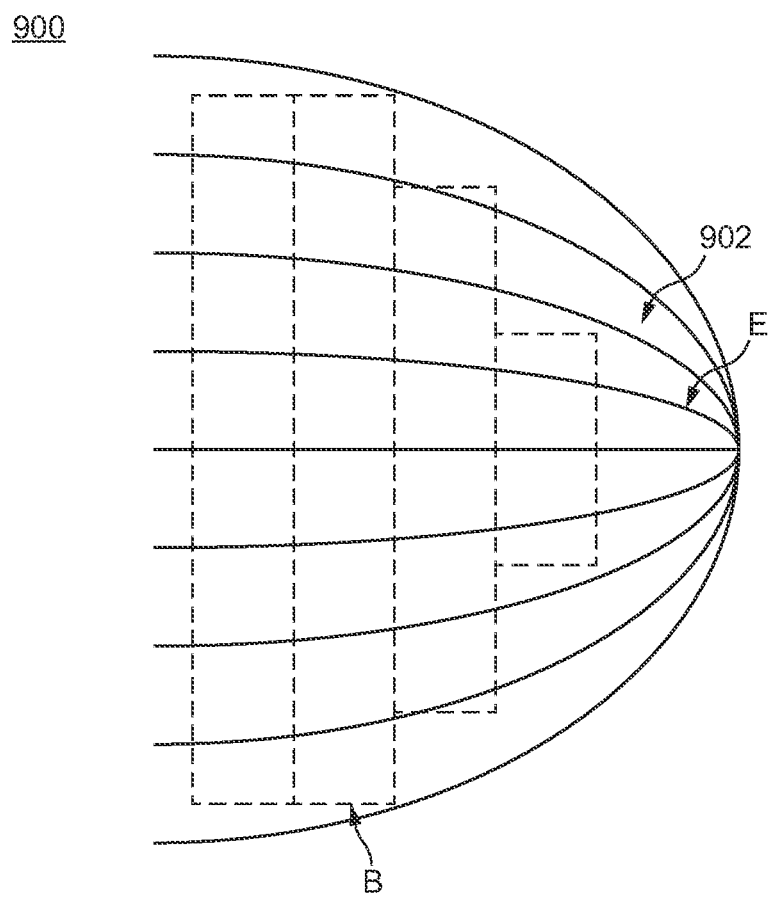
FIG. 9 schematically shows a cross-sectional view of an edge region of the preform, following a forming process, normal to a warp or longitudinal direction.

After a forming operation (e.g. a resin infusion operation and/or a curing operation to form the woven structure into the near net shape of the component), the woven structure comprises both matrix and fibre reinforcement material, and is cured to form a resulting composite component. A partial cross-sectional view of an example component 900, corresponding to the edge region 508 as depicted in FIG. 8a, is shown in FIG. 9. This shows the weave structure (stacks B and weft fibre tows E) within the matrix 902. It can be seen in FIG. 9 that the unbound portions $E_2$ of the weft tows E are retained in the matrix material 902. In this way, a relatively high fibre volume fraction is retained towards the lateral edge 508, despite any reduction in the number of binding warp tows A (and in the weft binding number). As a result, the mechanical properties in the edge region 508 may be improved in comparison with a component which has a lower fibre volume fraction at a comparable (e.g. tapering) edge region 508.

A thickness reduction as described above can be achieved by varying the weave structure in the stacks towards the edge region, as will now be discussed with reference to FIGS. 10 and 11. Although the reduction in thickness and provision of unbound portions of the weft tows in a matrix complement each other and may be provided in a single woven structure, it will be appreciated that each of these features may also be implemented in example woven structures independently of the other.

Referring to FIG. 10, various pairs of stacks for use in an edge region to result in a reduction of thickness towards the respective lateral side will now be described. In each of the pairs of weave stacks, a property of the weave structure is varied between the stacks to reduce the thickness. Recalling the discussion of FIG. 1c above, it will be appreciated that in the various examples of FIG. 10, the weft tows E extend out of the page, and the warp tows A follow the pattern along the warp direction P as shown. It will be appreciated that any region which includes a tapering thickness may include one or more of these variations in the structure in combination.

In each of the following examples, the variation between the first stack and the second stack is such that the second stack permits a reduction in thickness relative to the first stack. The first stack is the upper stack in the respective drawing, and the second stack is the lower stack.

FIG. 10a shows a first example pair in which a first (upper) stack has seven warp tows which are interwoven with eight weft tow layers in a layer-to-layer angle interlock weave. In the second (lower) stack, only six warp tows are present, again interwoven with eight weft tow layers. The weave structure in this case remains generally layer-to-layer angle interlock. In addition to reducing the number of warp tows, the second stack also incorporates a multi-weft step, which will be described in further detail below, to bind the same number of weft tows with a reduction in the number of warp tows. By reducing the number of warp tows, a thickness can be reduced.

In FIG. 10b, the first stack has seven warp tows which are interwoven with eight weft tows in a layer-to-layer angle interlock weave. However, in the second stack, the weave type is changed to an orthogonal through-thickness weave as described above with reference to FIG. 1c. In the second stack, the change in weave type means that the same number (seven) of weft tows can be bound with only a single warp tow. Accordingly, it will be understood that by varying the weave type, the thickness of the weave is reduced.

Figure 10C:
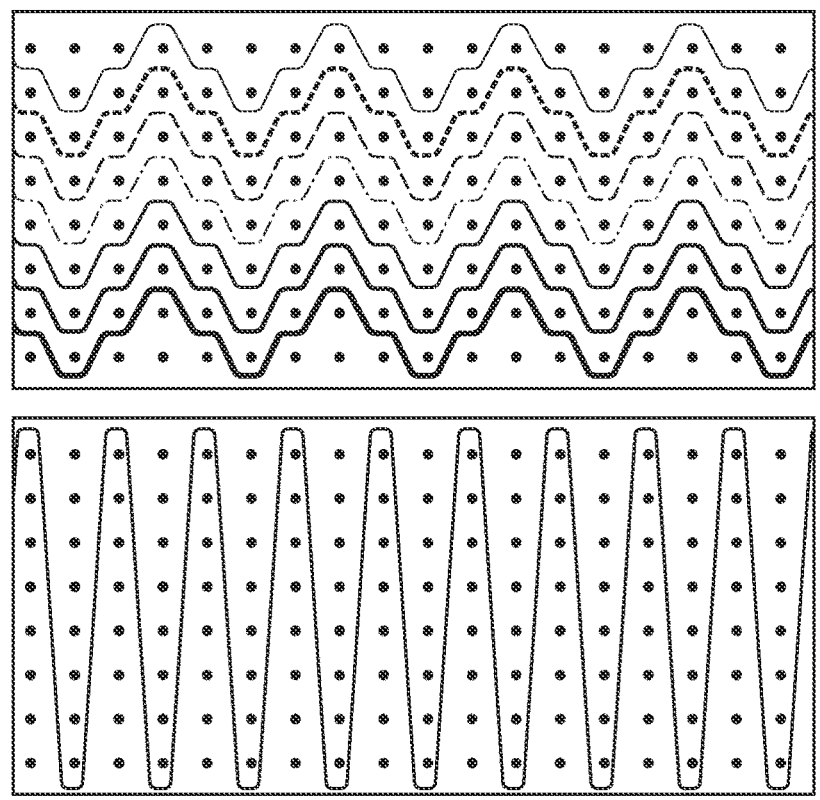

In FIG. 10c, the first stack has seven warp tows which are interwoven with eight weft tow layers in a layer-to-layer angle interlock weave. However, in the second stack, the weave type is changed to a through-thickness angle interlock weave. Again, in the second stack, the change in weave type means that the same number of weft tows (eight) can be interwoven with only a single warp tow. Accordingly, it will be understood that by varying the weave type, the local thickness of the structure can be reduced.

Figure 10D:
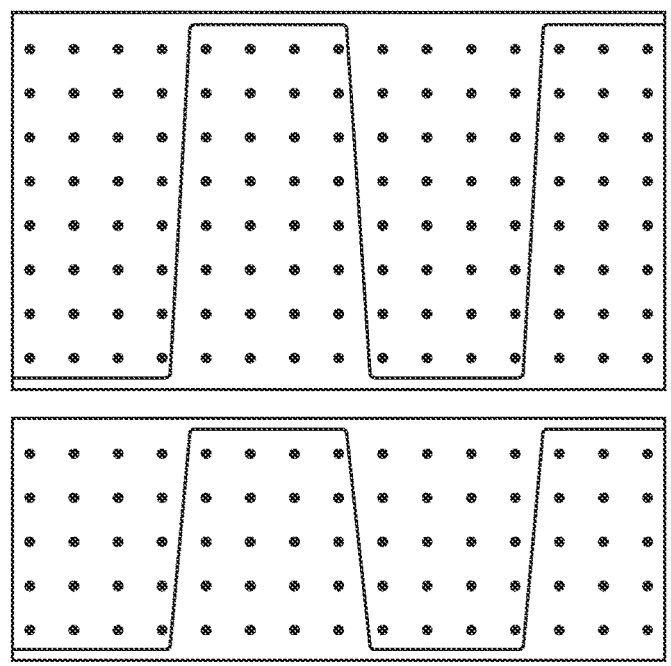

In FIG. 10d, the first stack has a single warp tow interwoven with eight weft tows in an orthogonal through-thickness weave. In the lower stack, the weave type remains the same, but the single warp tow binds only five weft tows.

By reducing the number of bound weft tows (defined above as a weft binding number), a thickness can be reduced.

Figure 10E:
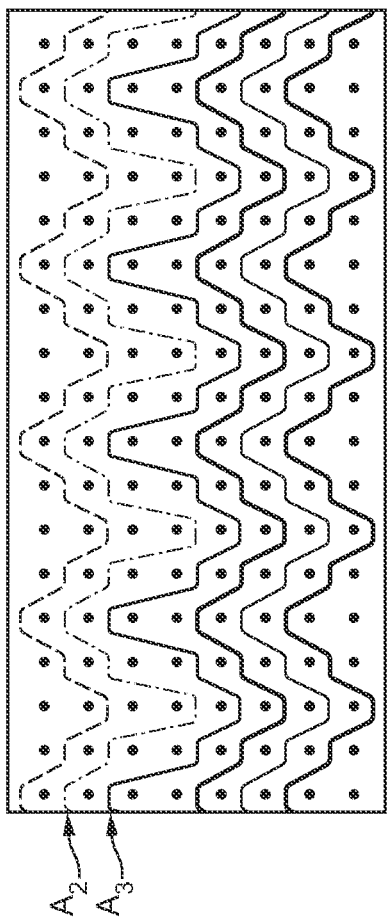
Figure 10E:
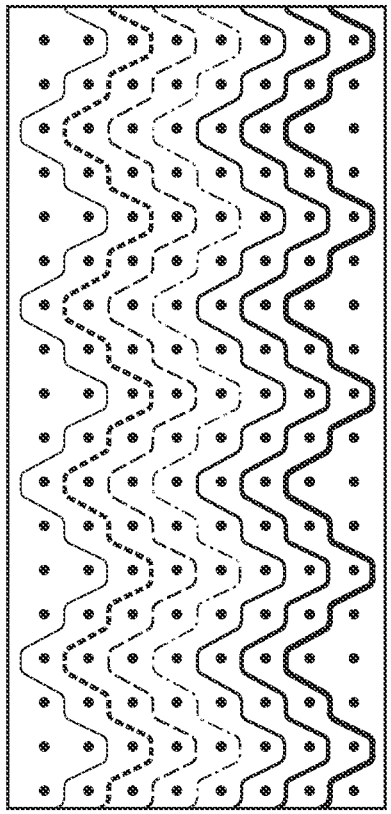

In FIG. 10e, the first stack (the left-most stack in the drawing) has seven warp tows which are interwoven with eight weft tows in a layer-to-layer angle interlock weave.

In the second stack (the right-most stack in the drawing), six warp tows are interwoven with eight weft tows, in a layer-to-layer angle interlock weave including a multi-weft step. In particular, it can be seen that, at different positions along the warp, a pair of warp tows (the second and third warp tows $A_2$, $A_3$ from the top) each include a step or jump along a thickness direction to bind two (or more) weft layers at a single longitudinal position, instead of a single weft tow as is standard for a layer-to-layer angle interlock weave. By increasing a number of binding warp tows having a multi-layer step in a respective repeating pattern (i.e. in this example from zero to one), a thickness can be reduced.

Referring to FIG. 11, the thickness of the edge region may also be reduced in a lateral direction towards the side by varying the stack arrangement in the edge region 508.

As noted above, it is typical to provide an alternating arrangement of warp (non-binding) stacks and binding stacks along a weft direction of a woven preform. As noted above in the discussion of FIG. 1, a warp stack may comprise a warp tow extending in each warp tow position in the weave (e.g. at each and every location between weft tow layers). Accordingly, the amount of fibre in a warp stack may be relatively high compared with some arrangements of a binding stack (particularly through-thickness binding stacks having a single warp tow).

Figure 11C:
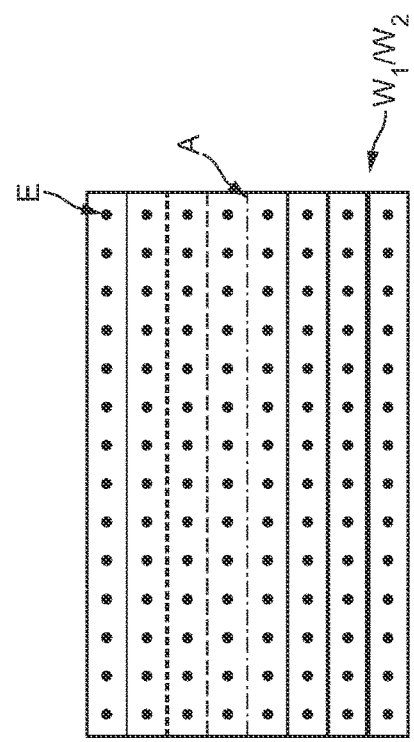
FIG. 11c schematically shows an example non-binding stack.

An example stack arrangement for an edge region as discussed above is shown in FIG. 11a, which comprises an alternating arrangement of binding B and warp (non-binding) W stacks. As described above with reference to FIG. 1c, and as shown in FIG. 11c, a warp stack comprises a plurality of warp tows A which extend substantially longitudinally through the stack without being interwoven between the weft tows E (i.e. the warp tows A remain substantially at a single thickness position).

In the binding stack marked $B_1$, the stack has a binding arrangement (e.g. in a layer-to-layer angle interlock weave), in particular having seven warp tows, binding eight weft tows. In the binding stack marked $B_2$, the number of warp tows is decreased to four (for example as discussed above with reference to FIG. 10), whilst the number of weft tows remains the same. In the binding stack marked $B_3$, the number of warp tows is again decreased to two, whilst the number of weft tows remains the same. By providing an alternating structure of binding and warp stacks, the warp stacks may regulate direction of the weft tows through the woven structure, which may help retain a desired shape of the woven structure. This arrangement of alternating binding and warp stacks may be most suitable for components which have an appreciable edge region over which the taper is implemented—e.g. a thicker vane.

Figure 11B:
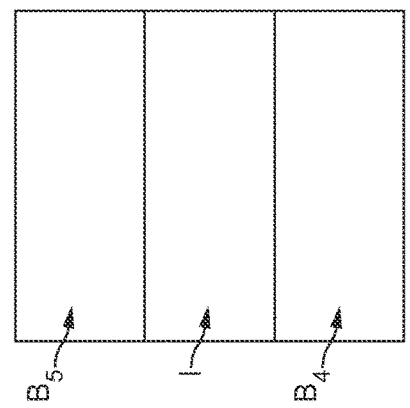
FIGS. 11a and 11b schematically show regions of an example woven structure.
Figure 11A:
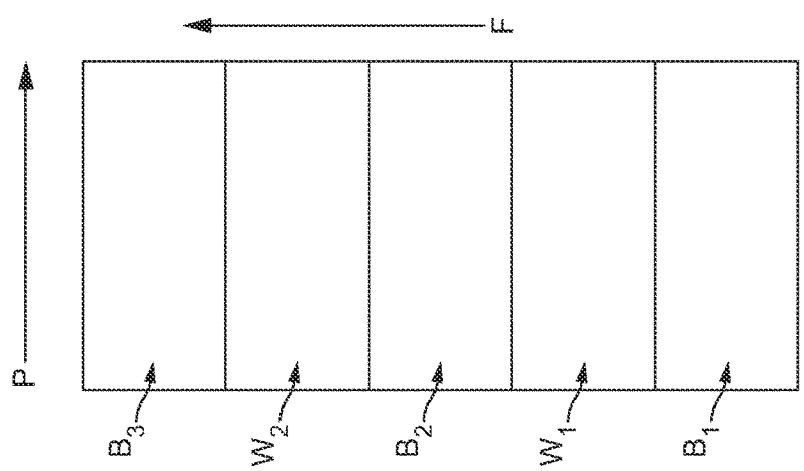

An alternative to the arrangement of FIG. 11a is shown in FIG. 11b. In this arrangement, the edge region comprises an alternating arrangement of binding stacks B and at least one intermediate stack 1.

An intermediate stack as referred to herein is a binding stack comprising a through-thickness angle interlock or through-thickness orthogonal interlock (e.g. as described above with reference to stack B2 of FIG. 1c). The adjacent binding stacks may comprise a different weave type, for example a weave type having two or more warp tows (e.g. a layer-to-layer angle interlock, optionally with a multi-weft jump as described above). By providing an intermediate stack I as described above between binding stacks B, a relatively greater thickness reduction may achieved over a relatively shorter lateral extent. Such an arrangement may be suitable for a component having a relative short lateral extent for a thickness reduction, such as a hollow component with a relatively thin wall (shell). Although there may be a relatively large change in fibre volume between the binding and intermediate stacks, the disclosed arrangement is considered to permit a desired thickness reduction and adequate overall volume fraction in the formed component within the edge region.

Figure 12:
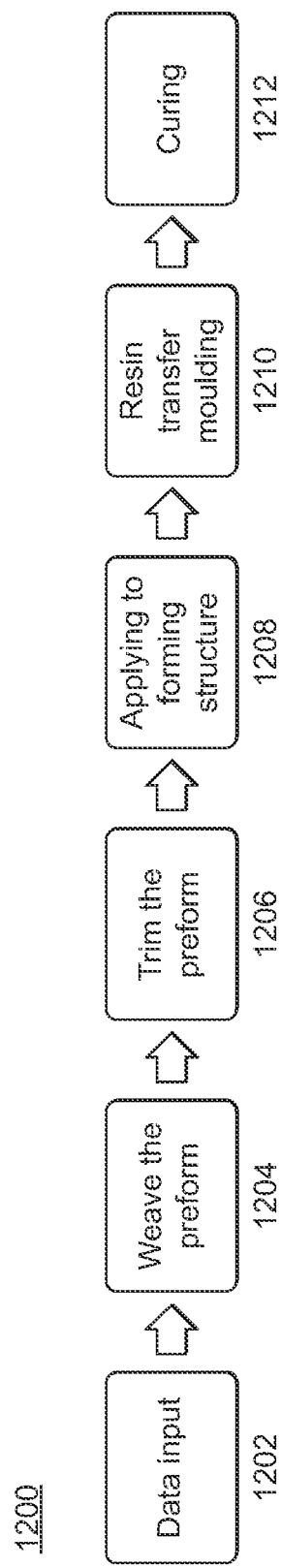
FIG. 12 illustrates a method of forming a component comprising a woven structure.

A method 1200 of forming a component comprising a woven structure as described above will now be described in greater detail with reference to FIG. 12.

In a first step 1202, weave data is input to a loom controller of a loom to be used for weaving the preform. The weave data may comprise model data and/or instructions for conducting a weaving operation, such as weave types for respective stacks and portions of the preform. In a second step 1204, the loom conducts the weaving operation to weave the preform according to the weave data. For example, the loom uses the weave data to conduct the weaving operation to form the rectangular woven preform 800 as shown in FIG. 7a (including shell portion 500, free portions 702, 704, tab portions 510 and trim portions to be trimmed). In other examples, it will be appreciated that the loom may receive weave data to produce a plurality of woven preforms 700 which are joined together, for example as described with respect to FIG. 3b, a plurality of separable woven preforms for forming discrete components.

In step 1206, the preform from the loom is trimmed to the required shape, and to separate any portions (e.g. between shell and tab portions as described above). As noted above, trimming along boundaries of respective portions (e.g. at the lateral sides of the shell) may be carried out in a single action, such as by a cutting press. As described above with reference to FIG. 7a, the trimming step may include trimming between any tab portions 510 and shell portions 500, such that these portions can be moved relative to each other. In an example where a plurality of woven preforms 700 to be joined together are formed by the loom, this trimming step may comprise cutting the preform at the cut point 240 as discussed with respect to FIG. 3.

In step 1208, the woven preform is applied to a forming structure, optionally including a mandrel (where the woven preform comprises a shell portion), to adopt a near net shape for the component. The woven preform and forming structure may then be placed in a sealing structure or mould for resin transfer moulding. For example, a mandrel may be inserted between two leaves of any shell portion 500, and any free portions 702, 704 may be arranged on a respective portion of the forming structure. Any tab portions 510 may be folded over and placed adjacent to corresponding opposing tab portions 510 such that the tab portions 510 overlay each other, on corresponding portion of the mandrel to enable the tab portions 510 to be joined in the next step.

In an example where a plurality of woven preforms 700 which are joined together are formed by the loom, this shaping step may comprise moving each woven preform 700 relative to the next (i.e. unfolding the sequence of woven preforms 700 as described with reference to FIG. 3).

In a step 1210, the mould is closed and resin is infused around the preform. A curing process is conducted at elevated pressure and temperature in step 1212 to form the composite component. After curing and subsequent removal from the sealing structure and the forming structure, the component (i.e. in these examples the vane, with or without the platform portions, or vane segment) may be subject to any finishing processing (e.g. machining) as required to adopt the net shape of the component.

We claim:

1. A method for weaving a preform for a component, comprising:
    weaving a multi-layer woven preform for the component from warp and weft tows of fibre-reinforcement material, so that the woven preform comprises:
        a longitudinal direction corresponding to an elongate extent of warp tows of the woven preform;
        a lateral direction transverse to the longitudinal direction;
        a multi-layer weave comprising:
            a plurality of weft tow layers, each layer comprising an array of weft tows distributed along the longitudinal direction, arranged so that weft tows from each weft tow layer are superposed at longitudinally-distributed positions in the multi-layer weave; and
            a plurality of laterally-adjacent stacks extending along the longitudinal direction, wherein each stack corresponds to a warp tow position along the lateral direction and comprises one or more warp tows in superposition within the stack; and
        a primary portion having a longitudinal extent along the woven preform, the primary portion having one or more edge regions each defining a respective lateral side of the primary portion;
    wherein for the or each edge region:
        the multi-layer weave defines at least the edge region;
        a plurality of stacks in the edge region are binding stacks in which one or more warp tows are interlaced to bind a respective plurality of weft tow layers; and
        a weave property differs between binding stacks in the edge region to reduce a thickness of the edge region towards the respective lateral side; and
    wherein the step of weaving the woven preform is conducted so that, in the or each edge region:
        the binding stacks each have a plurality of warp tows which are interlaced to bind a respective plurality of weft tow layers; and
        the multi-layer weave has an alternating pattern of binding stacks and one or more intermediate stacks, each intermediate stack comprising a through-thickness angle interlock or through-thickness orthogonal interlock type of multi-layer weave.

2. The method of claim 1, wherein the weave property is one or more selected from the group consisting of:
    a number of warp tows in a respective binding stack, defined as a binding warp number;
    a type of multi-layer weave, selected from the group consisting of a layer-to-layer angle interlock; through-thickness angle interlock; through-thickness orthogonal interlock;
    a number of weft tows bound in the respective stack, defined as a weft binding number;
    for binding stacks having a layer-to-layer angle interlock multi-layer weave type, a number of binding warp tows having a multi-layer step in a respective repeating pattern, wherein a multi-layer step comprises a binding warp tow extending through two or more weft tow layers at the same longitudinal position.

3. The method of claim 1, wherein the step of weaving the woven preform is conducted so that, in the or each edge region:
    the multi-layer weave has an alternating pattern of binding stacks and one or more non-binding stacks, wherein in each non-binding stack a majority of the warp tows remain at a single depth-wise position between weft tow layers without interlacing.

4. The method of claim 1, wherein for the or each edge region, a number of weft tow layers bound in the respective stack is defined as a weft binding number; and
    along the lateral direction through the edge region towards the respective lateral side, the weft binding number reduces so that a plurality of partially bound weft tows have an unbound portion extending beyond a bound region of the multi-layer weave.

5. The method of claim 1, wherein weaving the multi-layer preform for the component is conducted so that, for one or more of the edge regions:
    binding stacks in the edge region have a layer-to-layer angle interlock multi-layer weave type, a number of binding warp tows in the respective stack being defined as a binding warp number; and
    wherein along the lateral direction through the edge region towards the respective lateral side, the binding warp number reduces.

6. The method of claim 1, wherein the step of weaving the woven preform is conducted so that the primary portion is a shell portion comprising two leaves in superposition, each having a multi-layer weave, the leaves being joined at the one or more edge regions by binding tows extending between the leaves, wherein adjacent to the edge region the leaves are separable from one another.

7. The method of claim 6, wherein the shell portion comprises two edge regions at respective lateral sides and is configured to form an inter-leaf channel therebetween;
    wherein the method further comprises inserting a forming element into the inter-leaf channel to cause the shell portion to adopt a near net shape for the component.

* * * * *